United States Patent
Tsunoda et al.

(10) Patent No.: US 9,473,733 B2
(45) Date of Patent: Oct. 18, 2016

(54) WIRELESS COMMUNICATION SYSTEM

(71) Applicant: RICOH IMAGING COMPANY, LTD., Tokyo (JP)

(72) Inventors: Naoki Tsunoda, Tokyo (JP); Koichi Ishibashi, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 190 days.

(21) Appl. No.: 14/527,154

(22) Filed: Oct. 29, 2014

(65) Prior Publication Data

US 2015/0116522 A1    Apr. 30, 2015

(30) Foreign Application Priority Data

Oct. 30, 2013    (JP) .................................. 2013-226066

(51) Int. Cl.
| | |
|---|---|
| *H04N 5/765* | (2006.01) |
| *H04N 5/77* | (2006.01) |
| *H04N 5/907* | (2006.01) |
| *H04N 9/804* | (2006.01) |
| *H04N 9/82* | (2006.01) |

(52) U.S. Cl.
CPC .............. *H04N 5/765* (2013.01); *H04N 5/772* (2013.01); *H04N 5/907* (2013.01); *H04N 9/8042* (2013.01); *H04N 9/8227* (2013.01)

(58) Field of Classification Search
CPC .............. H04N 1/00095; H04N 1/21–1/2195; H04N 1/2112–1/2154; H04N 1/2158; H04N 5/23203; H04N 5/76–5/956; H04N 5/77; H04N 5/772; H04N 7/148; H04N 7/185; G03B 13/19656
USPC ....... 348/211.99, 211.2, 211.3, 211.4, 211.6, 348/211.8, 211.9, 211.14, 231.9, 231.99
See application file for complete search history.

(56) References Cited

U.S. PATENT DOCUMENTS

| | | | |
|---|---|---|---|
| 8,169,848 B2* | 5/2012 | Honda | H04N 1/00281 365/185.33 |
| 9,204,477 B2* | 12/2015 | Tsumagari | H04W 76/023 |
| 2002/0135685 A1 | 9/2002 | Tsunoda | |

(Continued)

FOREIGN PATENT DOCUMENTS

| | | |
|---|---|---|
| JP | 2002-204381 | 7/2002 |
| JP | 2002-329180 | 11/2002 |

(Continued)

*Primary Examiner* — Aung S Moe
*Assistant Examiner* — Chriss Yoder, III
(74) *Attorney, Agent, or Firm* — Greenblum & Bernstein, P.L.C.

(57) ABSTRACT

A wireless communication system, comprising: an imaging apparatus; a storage medium attached to the imaging apparatus; and a terminal device, wherein the imaging apparatus comprises: a controller to control operation of the imaging apparatus and to execute transmission/reception of data, wherein the storage medium comprises: a first wireless communication unit; and a control unit to execute transmission/reception of data, wherein the terminal device comprises: a command generating unit to generate a command for controlling the operation of the imaging apparatus; and a second wireless communication unit, wherein: the controller executes a checking process in a predetermined cycle; and when the controller determines that the storage medium has received the command, the controller controls the operation of the imaging apparatus in accordance with the command and transmits an instruction to change operation of the control unit to the storage medium in accordance with the operation of the imaging apparatus.

17 Claims, 17 Drawing Sheets

(56) References Cited

U.S. PATENT DOCUMENTS

| | | |
|---|---|---|
| 2004/0125214 A1 | 7/2004 | Oka et al. |
| 2004/0233292 A1 | 11/2004 | Tsunoda |
| 2006/0028561 A1 | 2/2006 | Tsunoda |
| 2006/0268126 A1 | 11/2006 | Ishibashi et al. |
| 2006/0279645 A1 | 12/2006 | Ishibashi et al. |
| 2007/0038735 A1* | 2/2007 | Tsunoda ............. H04N 1/00127 709/223 |
| 2007/0200862 A1 | 8/2007 | Uchiyama et al. |
| 2007/0236581 A1 | 10/2007 | Uchiyama et al. |
| 2010/0289924 A1 | 11/2010 | Koshikawa et al. |
| 2010/0289925 A1 | 11/2010 | Koshikawa et al. |
| 2012/0249832 A1 | 10/2012 | Okamoto et al. |

FOREIGN PATENT DOCUMENTS

| | | |
|---|---|---|
| JP | 2004-159281 | 6/2004 |
| JP | 2004-304776 | 10/2004 |
| JP | 2006-50172 | 2/2006 |
| JP | 2006-339766 | 12/2006 |
| JP | 2006-345029 | 12/2006 |
| JP | 2007-48150 | 2/2007 |
| JP | 2007-202110 | 8/2007 |
| JP | 2007-218896 | 8/2007 |
| JP | 4601058 | 10/2010 |
| JP | 2010-268184 | 11/2010 |
| JP | 2010-268217 | 11/2010 |
| JP | 2011-050017 | 3/2011 |
| JP | 2012-209658 | 10/2012 |

* cited by examiner

WIRELESS COMMUNICATION SYSTEM

BACKGROUND OF THE INVENTION

The present invention relates to a wireless communication system, and particularly to a wireless communication system including an imaging apparatus, a storage medium with a wireless communication function, and a terminal device.

Recently, imaging apparatuses, such as cameras, configured to have the wireless communication function and to be remotely controllable have been proposed. In Japanese Patent Provisional Publication No. 2011-050017A (hereafter, referred to as patent document 1), a system in which a slave camera is controlled from a master camera or a remote controller is described.

A storage medium, such as an SD memory card, capable of exchanging data by wireless communication, by configuring the storage medium to have the wireless communication function, is also known. Japanese Patent Provisional Publication No. 2002-329180A (hereafter, referred to as patent document 2) describes, as a storage medium of this type, a storage medium having the wireless communication function used in a state where the storage medium is attached to an electronic device, such as a PDA (Personal Digital Assistant). In the system described in patent document 2, when data is exchanged between electronic devices, the electronic device accesses directly a memory in the storage medium without accessing via a built-in memory provided in the electronic device.

SUMMARY OF THE INVENTION

However, in a conventional wireless communication system in which a storage medium having the wireless communication function, merely a data transmission function of transmitting data in the storage medium is provided, and therefore remote control for an electronic device, such as an imaging apparatus, to which the storage medium is attached is not realized. In order to execute the remote control for the imaging apparatus via the storage medium from an external device, the storage medium needs to be configured to have both the wireless communication function with the external device and the control function for the imaging apparatus. However, in general, there is a limit in size to the storage medium, and therefore it was difficult to configure the storage medium to have capability of processing a high load process to support the high functionality.

The present invention is advantageous in that it provides a wireless communication system which is capable of providing the function of remotely controlling an imaging apparatus via a storage medium having the wireless communication function.

According to an aspect of the invention, there is provided a wireless communication system, comprising: an imaging apparatus; a storage medium attached to the imaging apparatus; and a terminal device configured to execute wireless communication with the storage medium. The imaging apparatus comprises a controller configured to control operation of the imaging apparatus and to execute transmission/reception of data between the imaging apparatus and the storage medium. The storage medium comprises: a first wireless communication unit configured to execute wireless communication with the terminal device; and a control unit configured to execute transmission/reception of data between the storage medium and the imaging apparatus and transmission/reception of data between the storage medium and the terminal device. The terminal device comprises: a command generating unit configured to generate a command for controlling the operation of the imaging apparatus; and a second wireless communication unit configured to execute wireless communication with the storage medium. In this configuration, the controller executes a checking process to determine whether or not the storage medium has received the command through wireless communication in a predetermined cycle. When the controller determines that the storage medium has received the command through the checking process, the controller controls the operation of the imaging apparatus in accordance with the command and transmits an instruction to change operation of the control unit to the storage medium in accordance with the operation of the imaging apparatus.

With this configuration, the wireless communication system is able to provide the function of remotely controlling the imaging apparatus via the storage medium having the wireless communication function.

In at least one aspect, the imaging apparatus may further comprise: an image pickup device configured to generate an image signal of a subject; an image data generating unit configured to generate image data based on the image signal generated by the image pickup device; an imaging optical system that forms a subject image on the image pickup device; and an automatic focusing device configured to execute an autofocus process to detect a focal position of the subject image by moving at least a part of the imaging optical system. In this case, the automatic focusing device may be configured to execute the autofocus process when the command checked by the checking process is an autofocus command. The image data generating unit may be configured to generate the image data based on the image signal when the command checked by the checking process is a photographing command. The controller may execute a writing process of the image data into the storage medium.

In at least one aspect, the imaging apparatus may further comprise a video signal generating unit configured to generate a video signal based on the image signal. In this case, the video signal generating unit may be configured to generate the video signal when the command checked by the checking process is a live view command. The controller may execute a transmission process to transmit the generated video signal to the storage medium by frame. The storage medium may transmit the video signal to the terminal device by wireless communication.

In at least one aspect, while the controller executes the writing process of the image data into the storage medium, the controller may stop the transmission process to transmit the generated video signal to the storage medium by frame. The controller may restart the transmission process when the writing process of the image data is finished.

In at least one aspect, when the command checked by the checking process is the autofocus command, the controller may subsequently shorten, for a subsequent predetermined time, a cycle in which the checking process is executed relative to the predetermined cycle.

In at least one aspect, the imaging apparatus may further comprise a captured image generating unit configured to generate a captured image whose data size is smaller than that of the image data based on the image data generated by the image data generating unit. In this case, when the command checked by the checking process is a captured image generating command, the captured image generating unit may generate the captured image based on the image data generated by the image data generating unit. The controller may transmit the captured image to the storage medium.

In at least one aspect, while the controller transmits the captured image to the storage medium, the controller may lengthen a cycle in which the checking process is executed relative to the predetermined cycle and stop the transmission process to transmit the video signal to the storage medium. When transmission of the captured image to the storage medium is finished, the controller may change the cycle in which the checking process is executed to the predetermined cycle and restart the transmission process of the video signal.

In at least one aspect, the controller may operate to: make the cycle in which the checking process is executed shorter than the predetermined cycle while the transmission process of the video signal is stopped; and make the cycle in which the checking process is executed equal to the predetermined cycle while the transmission process of the video signal is executed.

In at least one aspect, when the controller confirms that the storage medium has received a touch shutter command through the checking process, the automatic focusing device may execute the autofocus process; the controller may execute a transmission process in which the video signal generated based on the image signal generated after execution of the autofocus process is transmitted to the storage medium by a predetermined number of frames; the image data generating unit may generate the image data based on the image signal generated after execution of the autofocus process after the transmission process of the video signal is finished; and the controller may execute the writing process of the generated image data into the storage medium.

In at least one aspect, the controller may operate to: stop the checking process when the imaging apparatus executes a process based on an input operation to the imaging apparatus by a user; and restart the checking process when the process based on the input operation to the imaging apparatus is finished.

In at least one aspect, the controller may operate to: transmit, to the storage medium, an instruction to inhibit executing wireless communication with the terminal device when the imaging apparatus executes a process based on an input operation to the imaging apparatus by a user; and transmit, to the storage medium, an instruction to permit executing wireless communication with the terminal device when the process based on the input operation is finished.

In at least one aspect, the imaging apparatus may further comprise a display device. In this case, the controller may operate to: transmit, to the storage medium, an instruction to inhibit executing wireless communication with the terminal device while the display device displays the image data stored in the storage medium in accordance with an input operation to the imaging apparatus by a user; and transmit, to the storage medium, an instruction to permit executing wireless communication with the terminal device while the display device does not display the image data stored in the storage medium.

In at least one aspect, the second wireless communication unit of the terminal device may transmit, to the storage medium via wireless communication, the command generated by the command generating unit together with a sequence number representing order at which the command is generated. In this case, the controller may operate to: check the sequence number as well as the command in the checking process; and ignore the command checked in the checking process when the sequence number is older than the sequence number of the command which has been already used for control of the imaging apparatus.

In at least one aspect, the controller may operate to: set the cycle in which the checking process is executed to a shorter cycle than the predetermine cycle when the controller is not able to confirm that the storage medium has received the command; and set the cycle in which the checking process is executed to a cycle equal to the predetermined cycle when the controller confirms that the storage medium has received the command through the checking process being executed in the shorter cycle.

In at least one aspect, the storage medium may further comprise a thumbnail generating unit configured to generate a thumbnail image having a size smaller than that of the image data based on the image data stored in the storage medium. In this case, the terminal device may further comprise an operation receiving unit configured to receive an input operation by a user. The terminal device may obtain the thumbnail image stored in the storage medium by wireless communication in response to the input operation.

In at least one aspect, when the imaging apparatus receives an input of an instruction to execute consecutive photographing by the user, the image data generating unit may execute the consecutive photographing in which a plurality of image data is generated based on the image signal at a predetermined time interval and the plurality of image data are sequentially stored in the storage medium until a number of the plurality of image data reaches a predetermined number or until an input of an instruction to stop the consecutive photographing by the user is received. The terminal device may further comprise a detection unit configured to detect execution of the consecutive photographing on the imaging apparatus. When the detection unit detects that the consecutive photographing is being executed, the terminal device may inhibit obtaining of the thumbnail image from the storage medium.

In at least one aspect, the imaging apparatus may further comprise a generating unit configured to sequentially generate, based on the plurality of image data generated through the consecutive photographing, a plurality of captured images each having a data size smaller than each of the plurality of the image data. In this case, the controller may transmit sequentially the generated plurality of captured images to the terminal device while the imaging apparatus executes the consecutive photographing.

BRIEF DESCRIPTION OF THE ACCOMPANYING DRAWINGS

DETAILED DESCRIPTION OF THE EMBODIMENTS

Hereinafter, a wireless communication system according to an embodiment of the invention is described with reference to the accompanying drawings.

Configuration of Wireless Communication System 1

Figure 1:
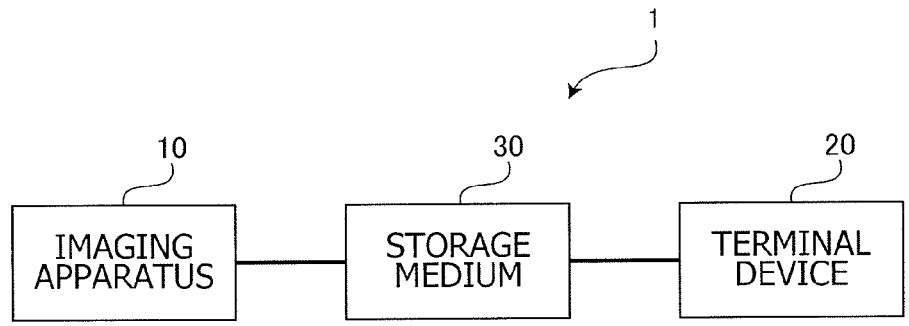
FIG. 1 is a block diagram of a wireless communication system according to an embodiment of the invention.

FIG. 1 is a block diagram illustrating a configuration of a wireless communication system 1 according to the embodiment. The wireless communication system 1 includes an imaging apparatus 10, a terminal device 20 and a storage medium 30 attached to the imaging apparatus 10.

The imaging apparatus 10 is an apparatus having the photographing function, and is, for example, a digital single lens reflex camera, a mirrorless single lens camera, a compact digital camera or a camcorder. The terminal device 20 has the wireless communication function and is configured to receive an input operation by a user. For example, the terminal device 20 is a smartphone, a feature phone, a tablet terminal, a PHS (Personal Handy Phone System), or a personal computer. The storage medium 30 has the wireless communication function, and is configured to be able to execute wireless communication with the terminal device 20. As the storage medium 30, an SD memory card having the wireless communication function can be used, for example.

Configuration of Imaging Apparatus 10

Figure 2:
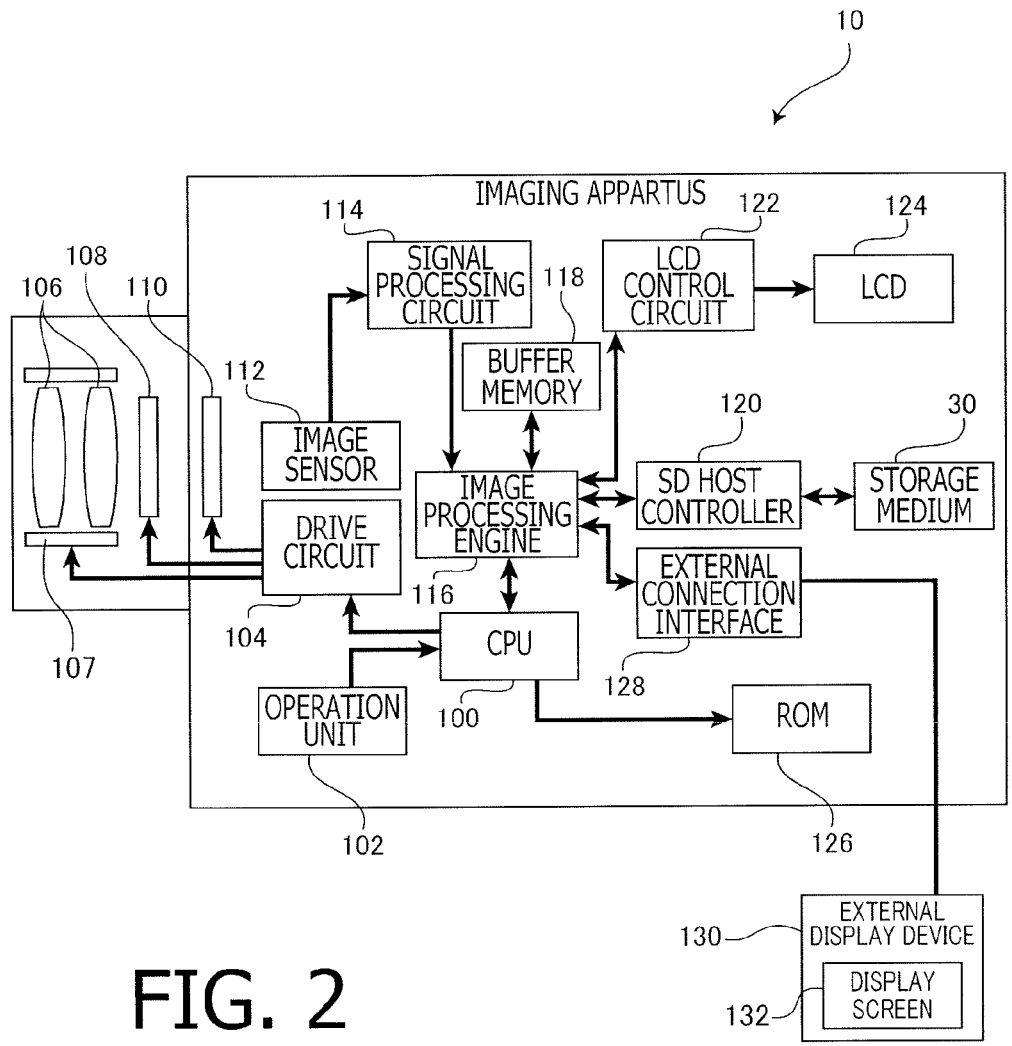
FIG. 2 is a block diagram of an imaging apparatus according to the embodiment of the invention.

FIG. 2 is a block diagram illustrating a configuration of the imaging apparatus 10. As shown in FIG. 2, the imaging apparatus 10 includes a CPU (Central Processing Unit) 100, an operation unit 102, a drive circuit 104, an imaging lens 106, a lens drive unit 107, an aperture stop 108, a shutter 110, an image sensor 112, a signal processing circuit 114, an image processing engine 116, a buffer memory 118, an SD host controller 120, an LCD (Liquid Crystal Display) control circuit 122, an LCD 124, a ROM (Read Only Memory) 126 and an external connection interface 128.

The operation unit 102 includes various switches, such as, a power switch, a release switch and a photographing mode switch, for allowing a user to operate the imaging apparatus 10. When the power switch is pressed by the user, power is supplied to various circuits of the imaging apparatus 10 from a battery (not shown) via a power line. After the power is supplied, the CPU 100 accesses the ROM 126 to read out and load a control program into a work area (not shown), and controls totally the imaging apparatus 10 by executing the loaded control program.

The CPU 100 drives and controls the aperture stop 108 and the shutter 110 via the drive circuit 104 so that appropriate exposure is obtained based on a photometric value measured by a TTL (Through The Lens) metering (not shown) provided in the imaging apparatus 10. More specifically, drive and control for the aperture stop 108 and the shutter 110 is executed based on the AE function designated by the photographing mode switch, such as, a program AE (Automatic Exposure), a shutter speed priority AE and an aperture priority AE. Drive and control for the lens drive unit 107 (hereafter, referred to as "AF control") is executed based on the AF (Autofocus) function. As the AF control, an active method, a phase difference detection method or a contrast detection method may be applied. When the AF control is executed, the lens drive unit 107 is driven and controlled via the drive circuit 104. As a result, the imaging lens 106 is moved, and the focus is achieved for a subject.

A light beam from the subject is received by the image sensor 112 after passing through the imaging lens 106, the aperture stop 108 and the shutter 110. The image sensor 112 is, for example, a CCD (Charge Coupled Device) image sensor or a CMOS (Complementary Metal Oxide Semiconductor) image sensor, and is configured to accumulate charges in response to the light amount of an optical image formed on each pixel of an imaging surface thereof, to convert the accumulated charges into an electric signal, and to output the electric signal to the signal processing circuit 114. The signal processing circuit 114 executes predetermined signal processing for the electric signal (image data) input from the image sensor 112, and outputs the processed signal to the image processing engine 116.

The image processing engine 116 executes predetermined signal processing, such as, color interpolation, a matrix operation and Y/C separation, for the signal output from the signal processing circuit 114, generates a luminance signal Y and color difference signals Cb and Cr, and compresses the processed signal in a predetermined format, such as JPEG (Joint Photographic Experts Group). The buffer memory 118 is used as a storage space for temporarily store processing data during execution of processes by the image processing engine 116.

To a card slot of the SD host controller 120, an SD memory card being the storage medium 30 is detachably attached. The SD host controller 120 is used to exchange data and control signals between the imaging apparatus 10 and the storage medium 30.

The image processing engine 116 is able to communicate with the storage medium 30 via the SD host controller 120. The SD host controller 120 stores the compressed image signal (image data) generated by the image processing engine 116 in the storage medium 30.

The image processing engine 116 executes predetermined signal processing for the signal which has been subjected to the Y/C separation, and buffers the processed signal in a frame memory (not shown) by the frame. The image processing engine 116 sweeps out the buffered signal from each frame memory at predetermined timings, converts the signal into a video signal in a predetermined format, and outputs the video signal to the LCD control circuit 122. The LCD control circuit 122 executes modulation control for the LCD based on the image signal input from the image processing engine 116. As a result, a photographed image of the subject is displayed on the LCD 124. The photographed image displayed on the LCD 124 corresponds to an imaging angle of view of the imaging apparatus 10. Thus, the user is able to view a real time through image (a live view) obtained at appropriate intensity and focus based on the AE control and AF control through the LCD 124.

When a user operation for reproducing a photographed image is conducted by the user, the image processing engine 116 reads out the image data designated by the user operation from the storage medium 30, coverts the read image data into an image signal in a predetermined format, and outputs the image signal to the LCD control circuit 122. The LCD control circuit 122 executes modulation control for the LCD based on the image signal output from the image processing engine 116. As a result, the photographed image of the subject is displayed on the LCD 124.

The external connection interface 128 is an interface for connection with an external display device 130. The external display device 130 is an electronic device having a display screen 132, and is, for example, a digital single lens reflex camera, a mirrorless single lens camera, a compact digital camera, a camcorder, a tablet terminal, a PHS, a smartphone, a feature pone, a portable game machine, a desktop PC, a notebook PC, or a television monitor.

The external connection interface 128 is able to communicate with a device, such as a desktop PC, using a wired connection protocol, such as HDMI™ or USB (Universal Serial Bus), or a wireless connection protocol, such as Wi-Fi™, Bluetooth™ or IrDA™. The image data is transferred to the external display device 130 via the external connection interface 128. The external display device 130 stores the transferred image data locally or in a URI (Uniform Resource Identifier) on a network. The external display device 130 decodes the image date stored locally or in a URI on a network, and displays the photographed image obtained by the decoding on the display screen 132, for example, in response to a user operation.

On the display screen 132 of the external display device 130, for example, contents (a still image or a through image) which are in synchronization with the LCD 124 are displayed. Let us consider a case where a user operation for reproducing a photographed image (a still image) is conducted by the user, for example. In this case, the image processing engine 116 displays the photographed image (the still image) designated by the user operation on the LCD 124, and transfers the photographed image to the external display device 130 via the external connection interface 128 so as to cause the external display device 130 to display, on the display screen 132, the photographed image which is the same as that displayed on the LCD 124.

When the external connection interface 128 is connected with a television monitor, the external connection interface 128 outputs a component video signal of the photographed image. Therefore, on the television monitor, contents (a still image or a live view) which are in synchronization with those of the LCD 124 are displayed.

It should be noted that supplemental information, such as overlay text, is displayed synchronously or asynchronously depending on the setting of the operation unit 102 by the user or displayed contents.

When a status screen of the imaging apparatus 10 is called through an operation to the operation unit 102, the status screen of the imaging apparatus 10 is displayed on the LCD 124 in place of the photographed image. On the status screen, status information regarding the imaging apparatus 10, such as, parameters required for the AE control and the AF control, the photographing mode, the shutter speed, the aperture, the ISO sensitivity, the recording format, or the number of photographable images is displayed. Through the status screen, the user checks the status or conducts a user operation for changing the setting.

Whether to display a photographed image, such as a still image or a live view, or the status screen on the LCD 124 can be switched by an operation to the operation unit 102. Furthermore, the setting regarding the LCD 124 may be made such that a live view is initially displayed on the LCD 124 when the imaging apparatus 10 is tuned ON, or may be made such that the user is allowed to select contents to be initially displayed on the LCD 124.

The LCD 124 may be formed as a touch panel through which the user is able to conduct an input operation by a finger or a stylus pen. When the LCD 124 is configured as a touch panel, the input operation to the touch panel may have the same function as the operation to the operation unit 102. In the following, the explanation is given assuming that the function of the imaging apparatus 10 is controlled by operating the operation unit 102; however, a part or all of the controls may be realized through an input operation to the touch panel.

Configuration of Terminal Device 20

Figure 3:
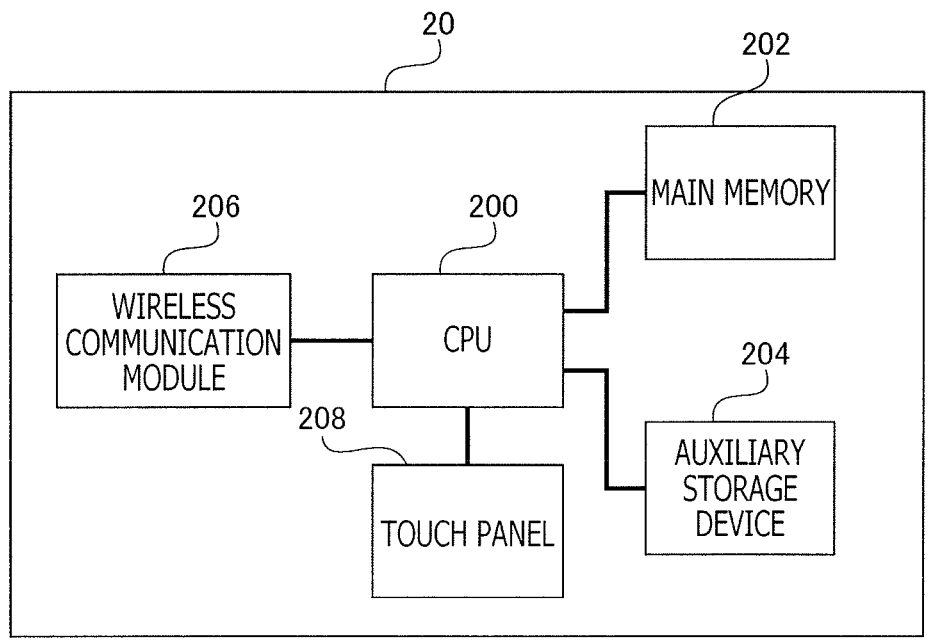
FIG. 3 is a block diagram of a terminal device according to the embodiment of the invention.

FIG. 3 is a block diagram illustrating a configuration of the terminal device 20. As shown in FIG. 3, the terminal device 20 includes a CPU 200, a main memory 202 such as a RAM (Random Access Memory), an auxiliary storage device 204 such as a flash memory, a wireless communication module 206 and a touch panel 208.

After the terminal device 20 is turned ON, the CPU 200 accesses required hardware. Specifically, after the terminal device 20 is turned ON, the CPU 200 reads out an OS (Operating System) by accessing the auxiliary storage device 204, and loads the OS into the main memory 202 to start the OS. Thereafter, through cooperation between the CPU 200 and the OS, various processes are executed by the terminal device 20. For example, in the auxiliary storage device 204, various types of applications including a browser have been installed. Each application is executed under management of resources and processes by the OS.

The browser is, for example, a web browser capable of interpreting HTML (Hyper Text Markup Language), CSS (Cascading Style Sheets), JavaScript™ and related specifications. The browser generates a request message complying with HTTP (Hypertext Transfer Protocol), accesses a URI (Uniform Resource Identifier) designated, for example, by the user, and downloads HTML contents such as a web page. The browser executes processing such as interpretation of the downloaded HTML contents, and generates a DOM (Document Object Model) tree, a layout tree and the like. The browser executes sequentially rendering in an image buffer in the main memory 202 for elements of the contents for which layout is determined. The contents rendered in the image buffer are transferred to a VRAM (Video Random Access Memory) (not shown). By transferring a result of the rendering to the VRAM, the HTML contents are displayed on the touch panel 208.

The user is able to conduct various types of user operations to the HTML contents displayed on the touch panel 208, such as, an input by pen-touch or finger-touch, screen scroll by a flick operation (a sweeping operation on a screen by a finger), or zooming-in/zooming-out by a pinching operation (expanding or reducing an interval between two fingers). In the following, explanation is given assuming, that the user conducts a user operation to the terminal device 20 via the touch panel 208; however, the present embodiment is not limited to such a configuration. The input operation to the terminal device 20 may be conducted through an operation unit, such as a button, a dial or a mouse.

Configuration of Storage Medium 30

Figure 4:
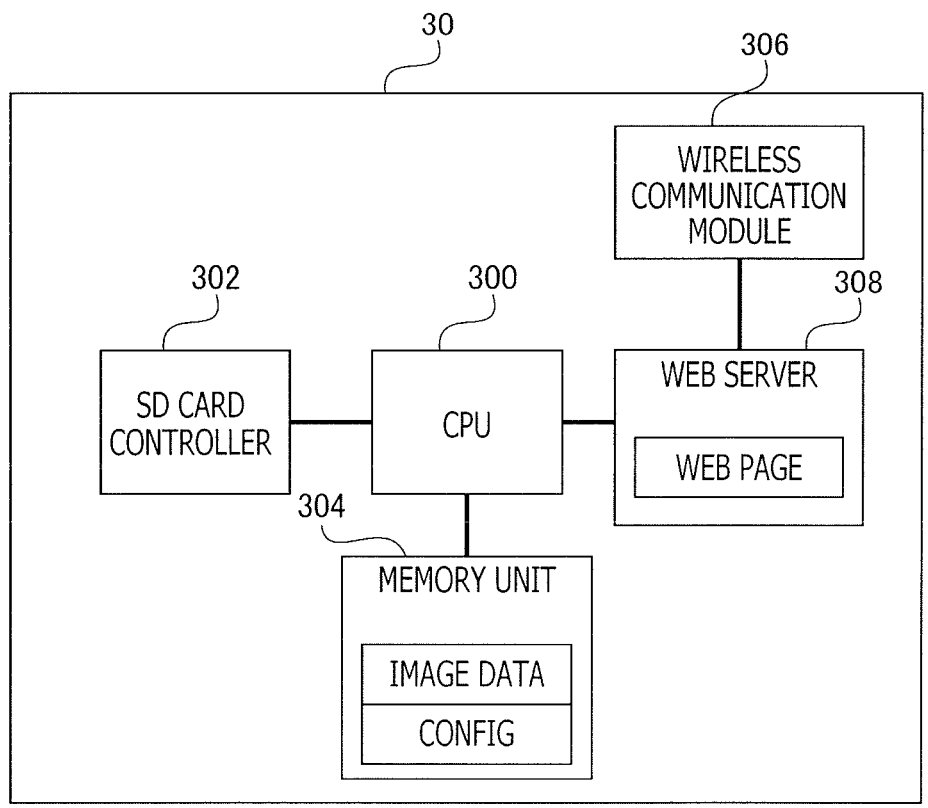
FIG. 4 is a block diagram of a storage medium according to the embodiment of the invention.

FIG. 4 is a block diagram illustrating a configuration of the storage medium 30. The storage medium 30 is configured to have the wireless communication function, and is used to store the image data generated by the imaging apparatus 10 and to execute wireless communication with the terminal device 20. In the following, explanation is given for a case where an SD memory card is used as the storage medium 30.

The storage medium 30 includes an SD card controller 302 which exchanges data with the imaging apparatus 10, a memory unit 304 which stores the image data transmitted from the imaging apparatus 10 and a configuration file for controlling operations of the storage medium 30, a wireless communication module 306 which executes wireless communication with the terminal device 20, a CPU 300 which executes signal processing for the data which is exchanged with the imaging apparatus 10 or the terminal device 20, and a web server 308. In the web server 308, a web page (e.g., HTML contents) which is to be transmitted to the terminal device 20 in response to an HTTP request from the terminal device 20 is stored.

When the storage medium 30 is attached to the card slot of the SD host controller 120 in the imaging apparatus 10, power is supplied thereto via the SD host controller 120 and the system of the storage medium 30 is started up. When the system startup process of the storage medium 30 is finished, the storage medium 30 receives communication parameters, such as, an SSID (Service Set Identifier), a network key, an encryption mode and a wireless channel, from the imaging apparatus 10. When the storage medium 30 receives the various communication parameters, the storage medium 30 starts the wireless communication module 306 and the web server 308 in accordance with the operation mode described in the configuration file. Thereafter, the storage medium 30 serves as an access point to wait for connection from the terminal device 20 being a web client.

The operation mode described in the configuration file is, for example, a mode for permitting or prohibiting the remote control for the imaging apparatus 10 by the terminal device 20, or a mode for permitting or prohibiting a response from the storage medium 30 to a request from the terminal device 20. The operation mode according to which the storage medium 30 operates may be switched depending on a command for remotely controlling the imaging apparatus 10 transmitted from the terminal device 20 to the storage medium 30 or a status of the wireless communication system 1, such as an operation status of the imaging apparatus 10.

The flow of data in the storage medium 30 varies depending on the operation mode. As data flows in the storage medium 30, the following three paths are considered, for example. The first path is a path from the wireless communication module 306 to the memory unit 304. This path is used in the operation mode where the terminal device 20 accesses data in the memory unit 304 via the web server 308. The second path is a path from the SD card controller 302 to the memory unit 304. This path is used in the operation mode (a memory access mode) where the image data generated by the imaging apparatus 10 is written into the memory unit 304. The third path is a path connecting the SD card controller 302 to the wireless communication module 306. This path is used primarily in transmission/reception of data between the terminal device 20 and the imaging apparatus 10. For example, when the operation mode is a live view mode, the storage medium 30 transmits the live view data received from the imaging apparatus 10, to the terminal device 20. Which of these paths should be used varies depending on switch of the operation mode of the storage medium 30. Switch of the operation mode is explained in detail below.

Wireless Connection between Terminal Device 20 and Storage Medium 30

The user is able to register an SSID of the storage medium 30 (the access point) through use of, for example, a setup utility installed in the terminal device 20, and to set the network key as the need arises. Thereafter, when the search for the access point of the storage medium 30 is executed by the terminal device 20, a list of the registered SSIDs is displayed on the touch panel 208 of the terminal device 20. When the SSID of the storage medium 30 is selected manually or automatically from the displayed list of the SSIDs, wireless connection between the terminal device 20 and the storage medium 30 is established. It should be noted that when the network key is set for the wireless communication of the storage medium 30, the wireless connection is established by inputting the network key to the setting screen on the touch panel 208 of the terminal device 20.

Obtaining of HTML Contents

When the wireless connection between the terminal device 20 and the storage medium 30 is established and the URI of the storage medium 30 is designated by the user on the browser, the browser issues a command (GET command) for obtaining HTML contents of the designated URI, and transmits the command to the storage medium 30. The web server 308 of the storage medium 30 transmits the HTML contents to the terminal device 20 in accordance with the received GET command. When the terminal device 20 receives the HTML contents, the HTML contents of the storage medium 30 are displayed on the browser as a web page. The HTML contents include, for example, a GUI (Graphical User Interface) of various icons, such as a release button, a photographing mode button switch and a thumbnail obtaining button. The displayed contents of the HTML contents are updated sequentially depending on the user operation to the touch panel 208.

When an input operation to the browser displayed on the touch panel 208 is conducted by the user, various request commands are transmitted to the storage medium 30. The web server 308 of the storage medium 30 is able to execute updating of a web page or switching of the screen displayed on the browser, browsing of a thumbnail of image data stored in the storage medium 30 or remote control of the imaging apparatus 10, by transmitting a response to the terminal device 20 in accordance with a received request command.

Displaying on Touch Panel 208

Figure 5A:
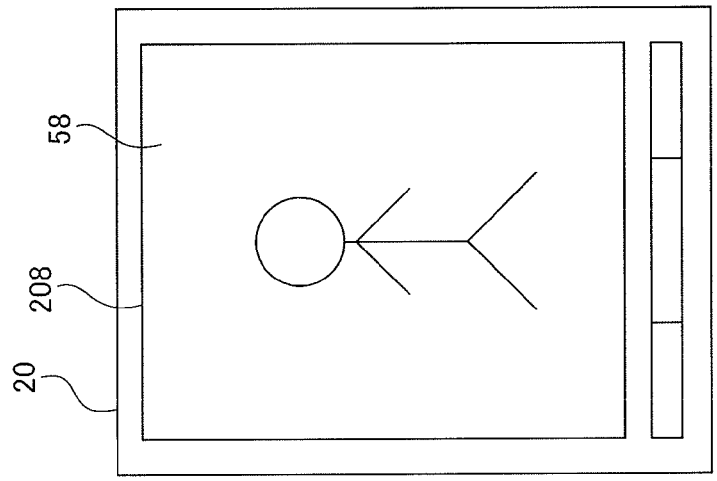
FIGS. 5A to 5C illustrate examples of HTML contents displayed on a touch panel according to the embodiment of the invention.
Figure 5B:
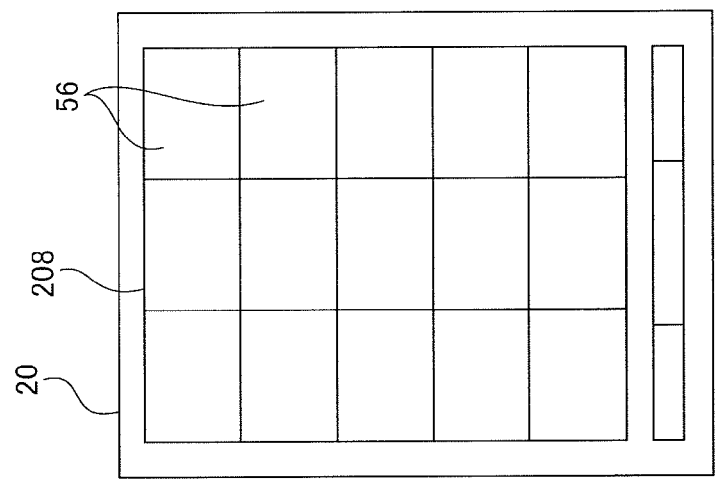
Figure 5C:
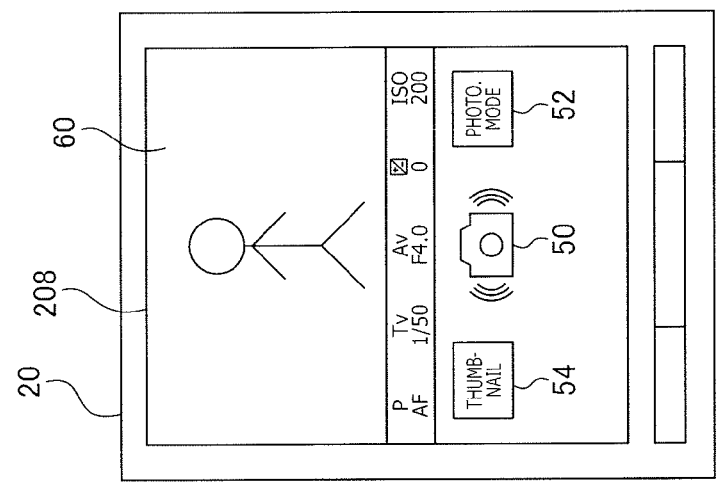

FIGS. 5A to 5C illustrate examples of display on the touch panel 208 of the terminal device 20. Specifically, FIG. 5A illustrates a display example of an icon 50 of the release button, an icon 52 of the photographing mode button, a thumbnail 54, setting information of the imaging apparatus 10 obtained from the imaging apparatus 10, and a live view 60 (described later) obtained from the imaging apparatus 10. The icons 50 and 52 of the release button and the photographing mode button are used to execute the remote control for the imaging apparatus 10 from the terminal device 20 via the storage medium 30. The setting information of the imaging apparatus 10 is, for example, the Tv value (Time Value), the Av value (Aperture Value), the ISO sensitivity or the exposure correction value of the imaging apparatus 10. By operating these icons, the user is able to instruct the imaging apparatus 10 to execute the shutter process or the switching process of the photographing mode.

FIGS. 5B and 5C are display examples of the thumbnails on the touch panel 208. When an operation for obtaining a thumbnail is made to the touch panel 208 by the user, thumbnails 56 of a plurality of image data stored in the storage medium 30 are displayed side by side (see FIG. 5B). When a operation for selecting a certain thumbnail from the plurality of thumbnails 56 is conducted by the user on the touch panel 208, a selected thumbnail 58 is displayed entirely on the touch panel 208 (see FIG. 5C).

Meanwhile, FIGS. 5A to 5C are display examples on the touch panel 208, and the embodiment is not limited to these examples. On the touch panel 208, a live view obtained from the imaging apparatus 10 may be displayed on the entire screen, and overlay information may be displayed on the displayed live view. The overlay information includes the setting of the imaging apparatus 10 and the icons of the release button and the photographing mode switch button. Furthermore, on the touch panel 208, a list of image data information concerning the respective thumbnails may be displayed together with the plurality of thumbnails stored in the storage medium 30. The image data information is, for example, a file name of the image data, settings of the imaging apparatus 10 and a date of photographing when the image data is generated. In this case, by allowing the user to select particular image data information from the list of the image data information, a thumbnail corresponding to the selected image data information is displayed on the entire screen of the touch panel 208.

In the following, detailed explanation is given for a method for obtaining a thumbnail of the image data stored in the storage medium 30, settings of the imaging apparatus 10 or a live view to be displayed on the touch panel 208. The remote control for the imaging apparatus 10 by the terminal device 20 is also explained below.

Obtaining of List of Image Data and Thumbnail

Figure 6:
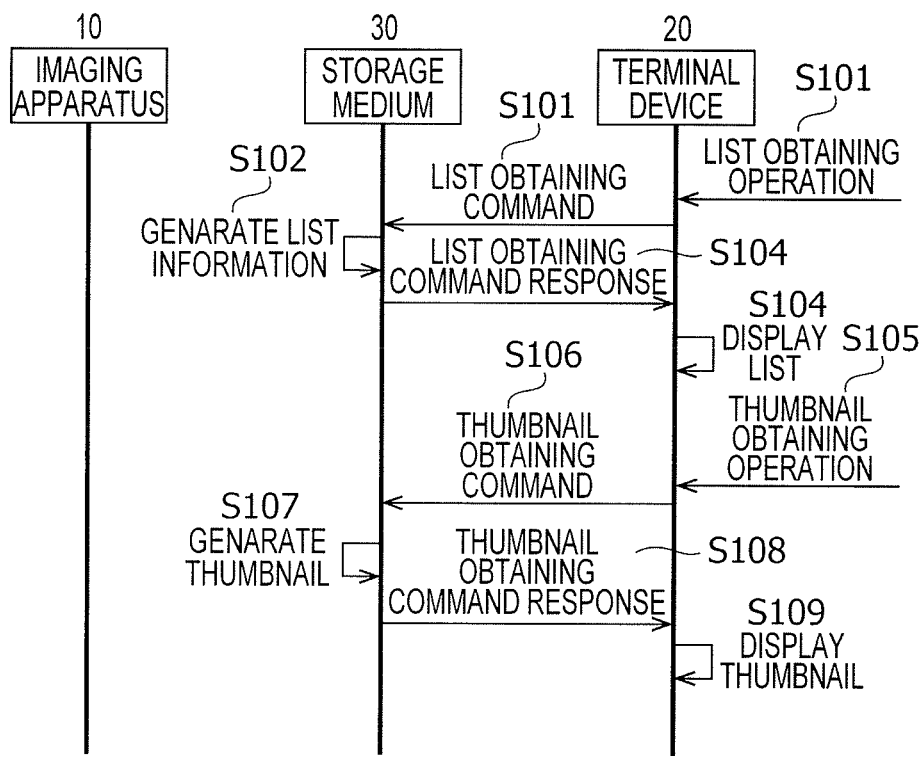
FIG. 6 is a sequence diagram in a case where a list or a thumbnail is obtained in the wireless communication system according to the embodiment of the invention.

The method for obtaining a list of image data and thumbnails stored in the storage medium 30 by the terminal device 20 is explained with reference to a sequence diagram shown in FIG. 6. FIG. 6 is a sequence diagram of a process executed in the wireless communication system 1 in which the imaging apparatus 10, the terminal device 20 and the storage medium 30 are provided. In the sequence diagram shown in FIG. 6, steps are executed from the upper side toward the lower side.

When an instruction to obtain a list of image data stored in the storage medium 30 is input to the browser by the user (S100), the browser generates a request command (e.g., GET /cgi-bin/photolist) for obtaining a list of image data and transmits the request command to the web server 308 of the storage medium 30 (S101). The web server 308 which has received the request command recognizes that a designated URI is CGI (Common Gateway Interface) based on a CGI command which has been registered in advance therein, and executes a CGI script corresponding to the designated URI. Here, by the CGI script (in this case, /cgi-bin/photolist), the list information of the image data stored in the memory unit 304 of the storage medium 30 is generated (S102), the list information is transmitted to the terminal device 20 (S103). Based on the received list information, the browser displays the list of the image data (S104).

When an instruction to select image data for which a thumbnail is to be obtained from the list of image data displayed on the browser is inputted by the user (S105), the browser generates a request command (e.g., GET /cgi-bin/thumbnail?fn=/DCIM/IMG01.JPG) for obtaining a thumbnail of the selected image data and transmits the request command to the web server 308 of the storage medium 30 (S106). The web server 308 which has received the request command recognizes that a URI designated by the request command is CGI, and executes a CGI script corresponding to the designated URI. Here, by the CGI script (in this case, /cgi-bin/thumbnail), a thumbnail of the selected image data (in this case, /DCIM/IMG01.JPG) is generated (S107), and the generated thumbnail is transmitted to the browser of the terminal device 20 (S108). The browser receives the thumbnail from the storage medium 30, and displays the thumbnail (S109).

Since each of the list obtaining command and the thumbnail obtaining request command is a command for obtaining information stored in the storage medium 30, the imaging apparatus 10 does not intervene in the communication between the terminal device 20 and the storage medium 30 shown in the sequence diagram of FIG. 6.

Obtaining Setting and Capability Value of Imaging Apparatus 10

Figure 7:
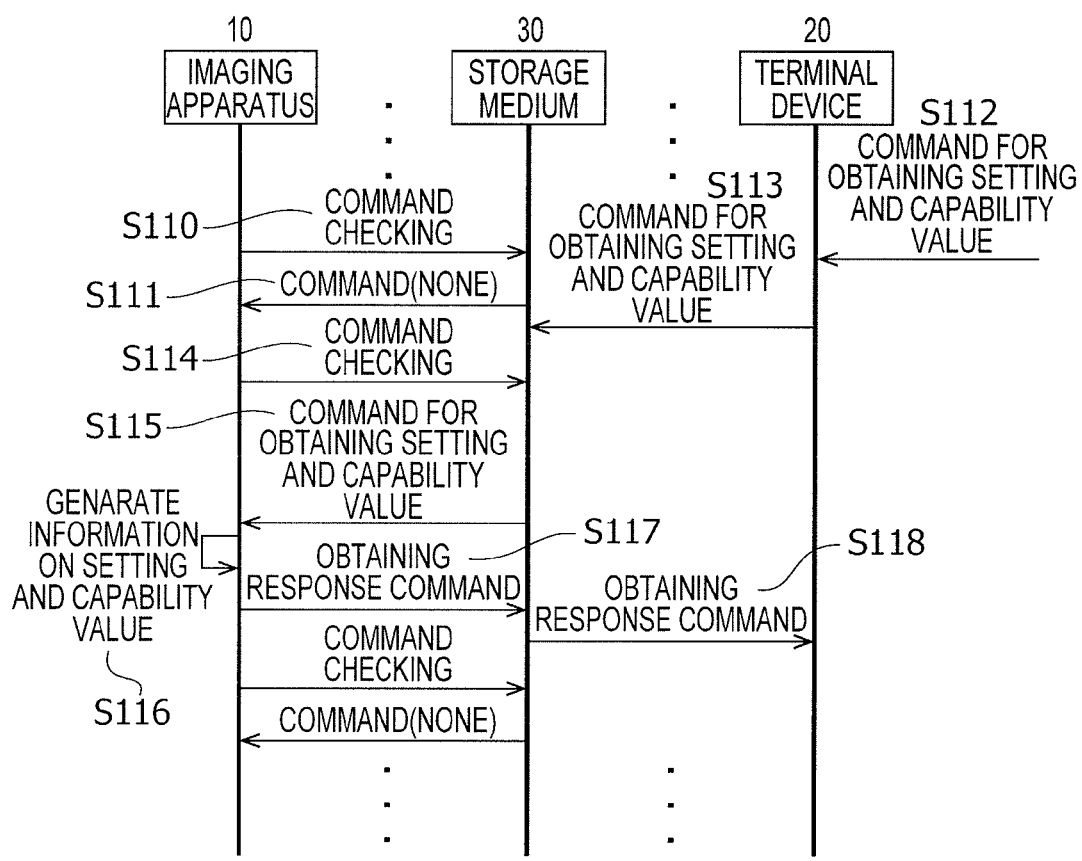
FIG. 7 is a sequence diagram in a case where setting and a capability value of the imaging apparatus are obtained in the wireless communication system according to the embodiment of the invention.

Next, remote control for the imaging apparatus 10 by the terminal device 20 is explained with reference to FIG. 7.

The imaging apparatus 10 checks periodically in predetermined intervals whether or not a command is transmitted from the terminal device 20 to the storage medium 30 (command checking) (S110). When the imaging apparatus 10 executes the command checking, if the storage medium 30 has not received a command from the terminal device 20, a signal indicating that no command exists is transmitted from the storage medium 30 to the imaging apparatus 10 (S111).

When an instruction to check the setting and a capability value of the imaging apparatus 10 is input to the touch panel 208 by the user (S112), the browser generates a request command (e.g., GET /host-operation?action=get-camera-config&config-entry=capability) for obtaining the setting and the capability value of the imaging apparatus 10. Here, the setting and the capability value of the imaging apparatus 10 are, for example, photographing parameters and specifications of the imaging apparatus 10 or the residual quantity of a battery provided in the imaging apparatus 10. The terminal device 20 transmits the generated request command to the web server 308 of the storage medium 30 (S113). The web server 308 which has received the request command recognizes that a URI designated by the request command is CGI for realizing the remote control of the imaging apparatus 10. Then, when the command checking by the imaging apparatus 10 is executed (S114), the received request command is transmitted to the imaging apparatus 10 as it is via the CPU 300 and the SD card controller 302 (S115).

The SD host controller 120 of the imaging apparatus 10 recognizes that the received request command is a command for remotely controlling the imaging apparatus 10, and passes the received request command to the CPU 100. The CPU 100 controls the imaging apparatus 10 in accordance with the received request command. In the sequence diagram shown in FIG. 7, the request command is an obtaining command for the setting and the capability value of the imaging apparatus 10. The setting and capability value of the imaging apparatus 10 are, for example, the presently set Tv value (Time value), Av value (Aperture value), ISO sensitivity and the exposure correction value. The CPU 100 generates such information (S116), and transmits the information to the storage medium 30 via the SD host controller 120 of the imaging apparatus 10 as a command response (S117). The storage medium 30 transmits the received command response to the browser of the terminal device 20 as it is (S118).

As described above, by transmitting the command generated by the browser to the imaging apparatus 10 via the storage medium 30, the remote control for the imaging apparatus 10 by the terminal device 20 is achieved.

AF and Shutter Process of Imaging Apparatus 10 Through Remote Control

As another example of the remote control, a case for letting the imaging apparatus 10 execute the autofocus (AF) process and the shutter process is explained with reference to a sequence diagram shown in FIGS. 8A and 8B.

When an operation for requesting the AF process of the imaging apparatus 10 is made to the touch panel 208 by the user, the browser of the terminal device 20 generates an AF request command (e.g., GET /host-operation?action=af), and transmits the AF request command to the web server 308 of the storage medium 30 (S120). The web server 308 which has received the request command recognizes that a URI designated by the received request command is CGI for realizing the remote control for the imaging apparatus 10. Then, when the command checking is executed by the imaging apparatus 10 (S121), the received request command is transmitted to the SD host controller 120 via the CPU and the SD card controller 302 as it is (S122). The SD host controller 120 passes the received request command to the CPU 100. The CPU 100 executes the AF process in accordance with the request command (S123). When the AF process is normally executed, a command response indicating that the AF process has been executed is transmitted to the terminal device 20 via the storage medium 30 (S124 and S125).

When an operation for requesting the shutter process of the imaging apparatus 10 is made to the touch panel 208 by the user after the AF process on the imaging apparatus 10 is finished (S126), the browser generates a shutter request command (e.g., GET /host-operation?action=shutter). Thereafter, as in the case of the AF process, the request command is transmitted to the imaging apparatus 10 via the storage medium 30 (S127 to S129), and the shutter process is executed on the imaging apparatus 10 (S130). In the shutter process, image data is generated by the image processing engine 116 based on the image signal generated by the image sensor 112. When the shutter process is normally executed, a command response indicating that the shutter process has been executed is transmitted from the imaging apparatus 10 to the terminal device 20 (S131 and S132).

When the terminal device 20 receives the command response indicating that the shutter process is executed, the terminal device 20 generates a request command (e.g., GET /host-operation?action=capture) for requesting a capturing process of image data and transmits the request command to the imaging apparatus 10 via the storage medium 30 (S133 to S135). The imaging apparatus 10 executes a writing process in which the image data generated by the image processing engine 116 is written into in the memory unit 304 of the storage medium 30 (S136). When this writing process is finished, the imaging apparatus 10 generates a captured image based on the image data (S137). The captured image is used to check what type of image data is generated through the shutter process, and the data amount of the captured image is smaller than that of the image data. The generated captured image is transmitted to the terminal device 20 via the storage medium 30 (S138). The terminal device 20 displays the captured image on the touch panel 208 based on the received captured image (S139).

Figure 8A:
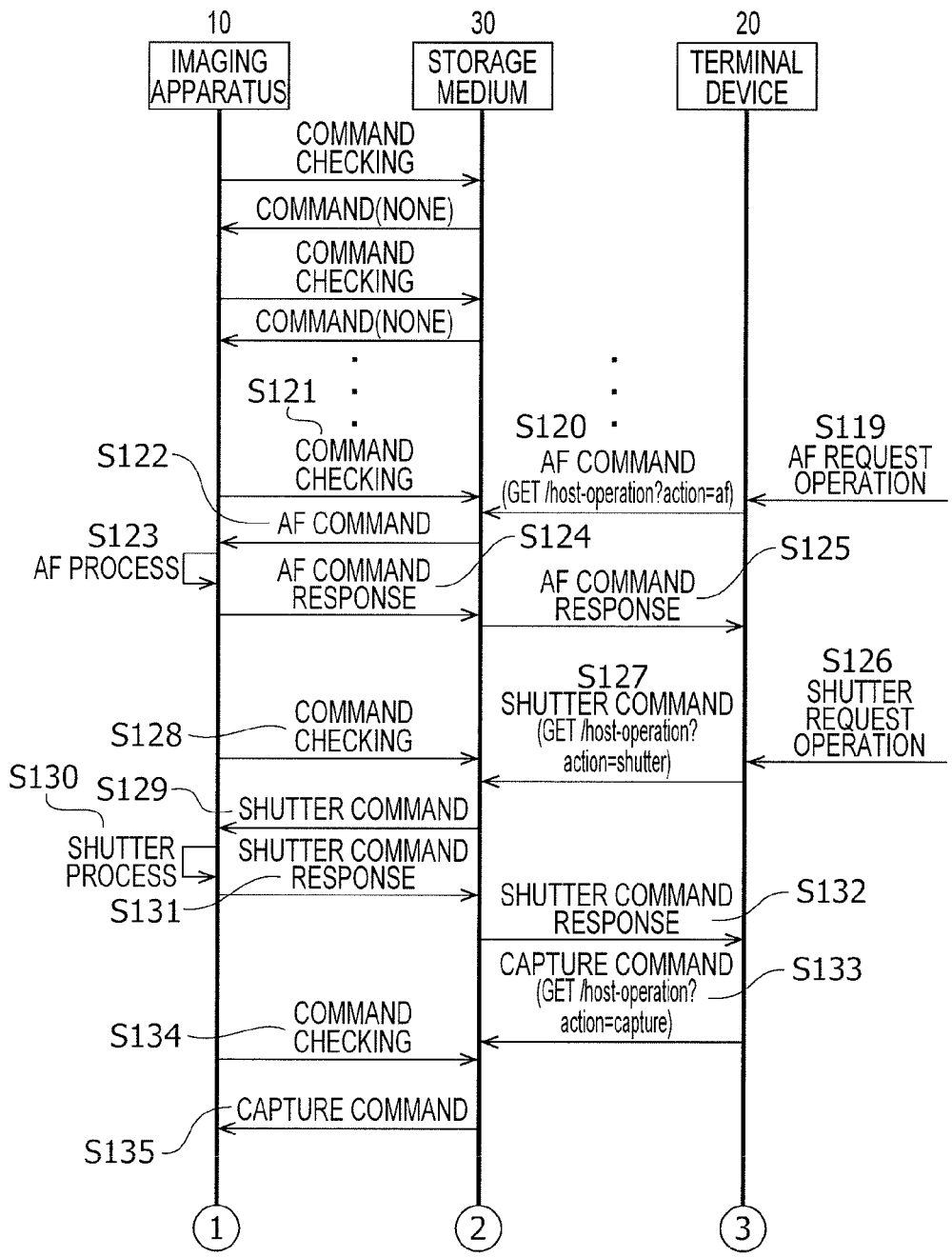
FIGS. 8A and 8B illustrate a sequence diagram in a case where the imaging apparatus is remotely controlled in the wireless communication system according to the embodiment of the invention.
Figure 8B:
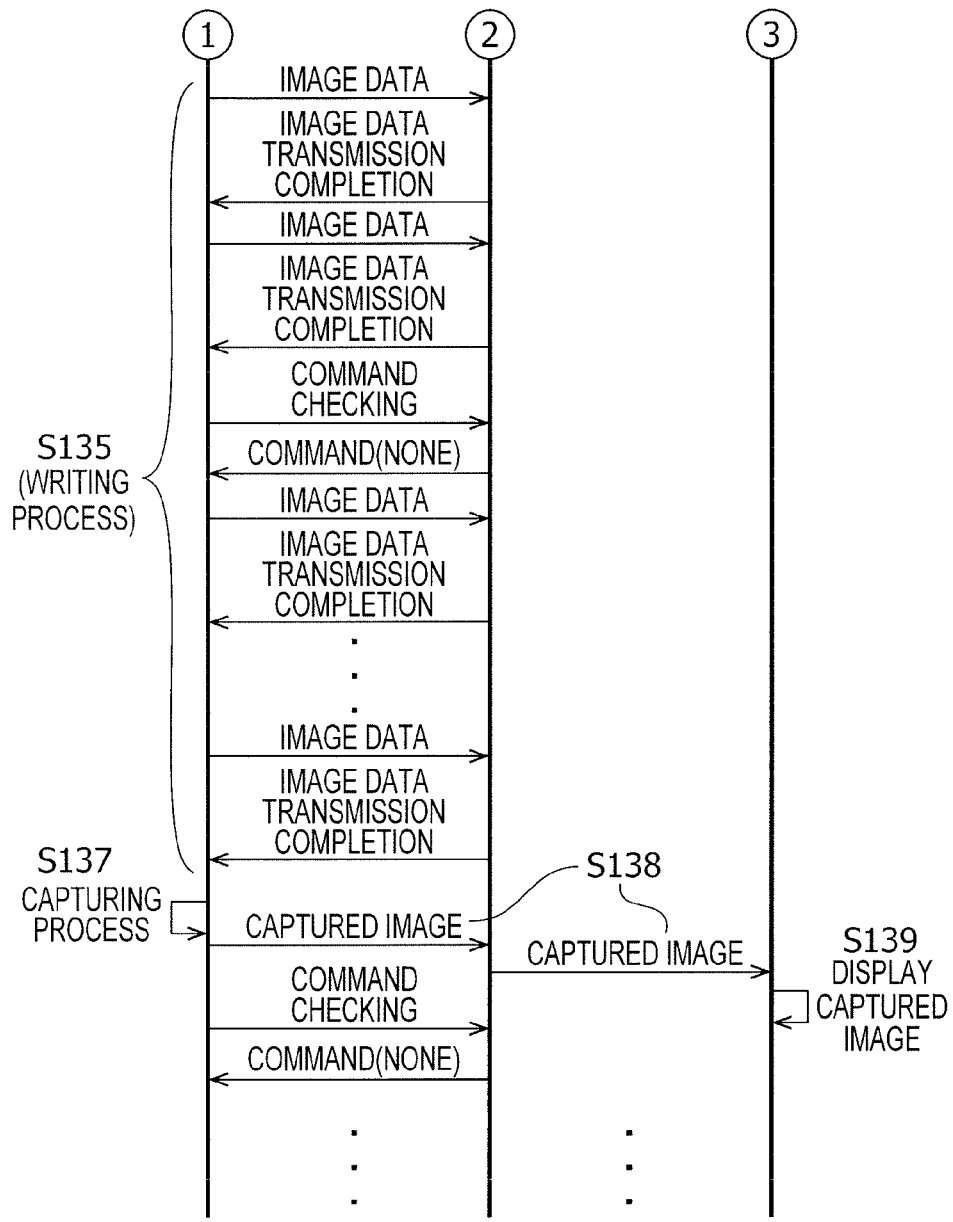

It should be noted that, in FIGS. 8A and 8B, "image data writing" and "image data writing end" are processed a plurality of times for one shutter request command. This is because one image data is divided into a plurality of pieces of data in accordance with the size of image data, and is stored in the memory unit 304 of the storage medium 30 in a fragmented state.

The command checking from the imaging apparatus 10 to the storage medium 30 may be executed while wiring of the image data to the storage medium 30 is executed over a plurality of times. As a result, when another command is transmitted from the terminal device 20 to the storage medium 30 while the image data is written into the storage medium 30, the imaging apparatus 10 may immediately execute a process corresponding to another command after the writing process of the image data to the storage medium 30 or the capturing process is finished.

In FIGS. 8A and 8B, the capturing process (S137) is executed after completion of the writing process (S136); however, the embodiment is not limited to such a configuration. The writing process (S136) may be executed after completion of the capturing process (S137) and the transmission process (S138) of the captured image, or the writing process (S136) and the capturing process (S137) may be executed concurrently.

Obtaining of Live View Data by Terminal Device 20

Figure 9:
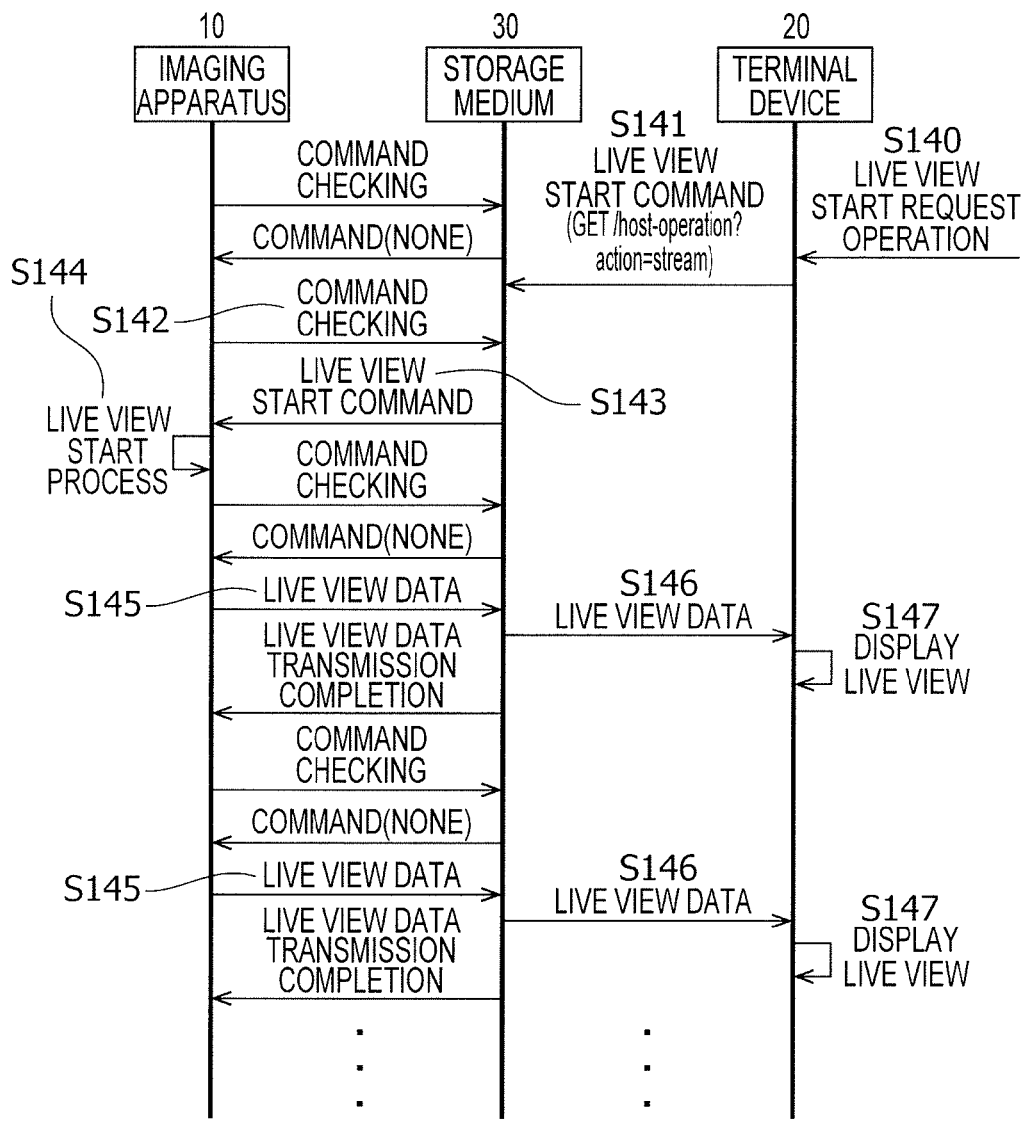
FIG. 9 is a sequence diagram in a case where a live view process is started in the wireless communication system according to the embodiment of the invention.

Next, a case where the wireless communication system 1 executes a live view process is explained with reference to a sequence diagram shown in FIG. 9.

When an operation for requesting start of a live view for observing a live view captured by the imaging apparatus 10 is made to the touch panel 208 (S140), the browser generates a request command (e.g., GET /mjpeg_video?action=stream) for starting a live view. Then, the terminal device 20 transmits the generated request command to the web server 308 (S141). The web server 308 which has received the request command recognizes that a URI designated by the request command is CGI for realizing the remote control for the imaging apparatus 10. Then, when the command checking is executed by the imaging apparatus 10 (S142), the received request command is transmitted to the imaging apparatus 10 as it is via the CPU 300 and the SD card controller 302 (S143). The imaging apparatus 10 executes a live view start process in accordance with the received request command (S144).

When the live view start process is executed on the imaging apparatus 10, the video signal generated by the image processing engine 116 is swept out by the frame. The SD host controller 120 transmits the swept video signal to the storage medium 30 as the live view data (S145).

The storage medium 30 transmits the received live view data to the terminal device 20 through wireless communication (S146), and the terminal device 20 displays the live view on the touch panel 208 based on the received live view data (S147). The live view displayed on the touch panel 208 is updated each time new live view data is received from the storage medium 30.

The live view process is continuously executed until a request command requesting for stop of the live view is received by the imaging apparatus 10 or until an input operation for stopping the live view is made to the imaging apparatus 10. Furthermore, the live view is stopped or restarted depending on the status of the wireless communication system 1. The case where the live view is stopped or restarted is explained later.

According to the wireless communication system 1 of the embodiment, when a command requesting for a process other than the live view is transmitted from the terminal device 20 or when an input operation for requesting for a process other than the live view is made to the operation unit 102 of the imaging apparatus 10, the live view process is stopped depending on the content of the requested process or the processing status.

According to the wireless communication system 1 of the embodiment, in addition to the live view process, the wireless communication between the terminal device 20 and the storage medium 30, the command checking process from the imaging apparatus 10 to the storage medium 30 and the like are stopped or restarted or the processing thereof is changed depending on the status of the wireless communication system 1.

The stopping or changing of these processes aim to reduce the load on the wireless communication system 1, and to speed up a process having high priority. In the flowing, stopping or changing of the process in the wireless communication system 1 depending on change of the status of the wireless communication system 1 is explained with reference to sequence diagrams.

AF and Shutter Processes by Remote Control in Live View Process

Figure 10A:
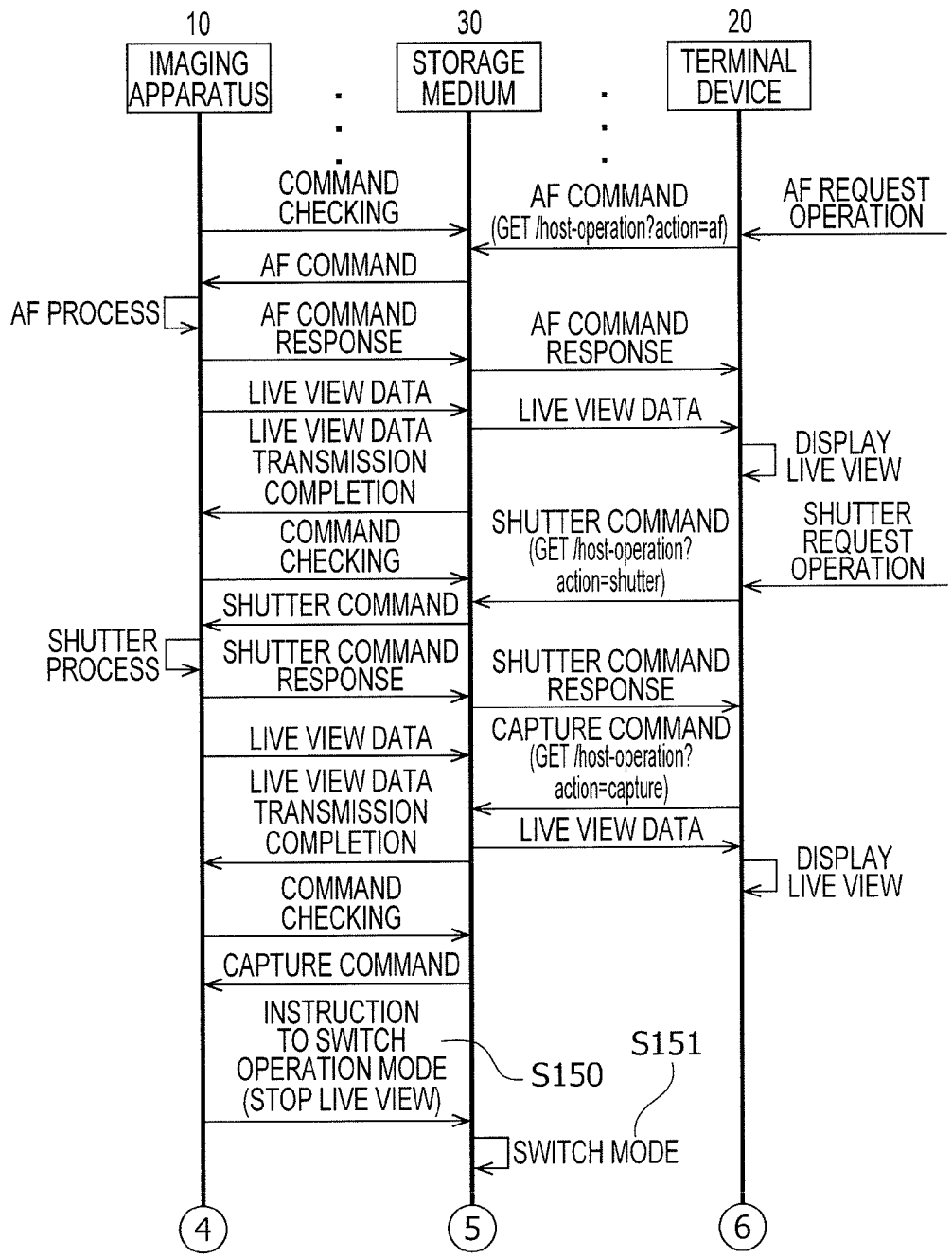
FIGS. 10A and 10B illustrate a sequence diagram in a case where the imaging apparatus is remotely controlled during the live view process in the wireless communication system according to the embodiment of the invention.
Figure 10B:
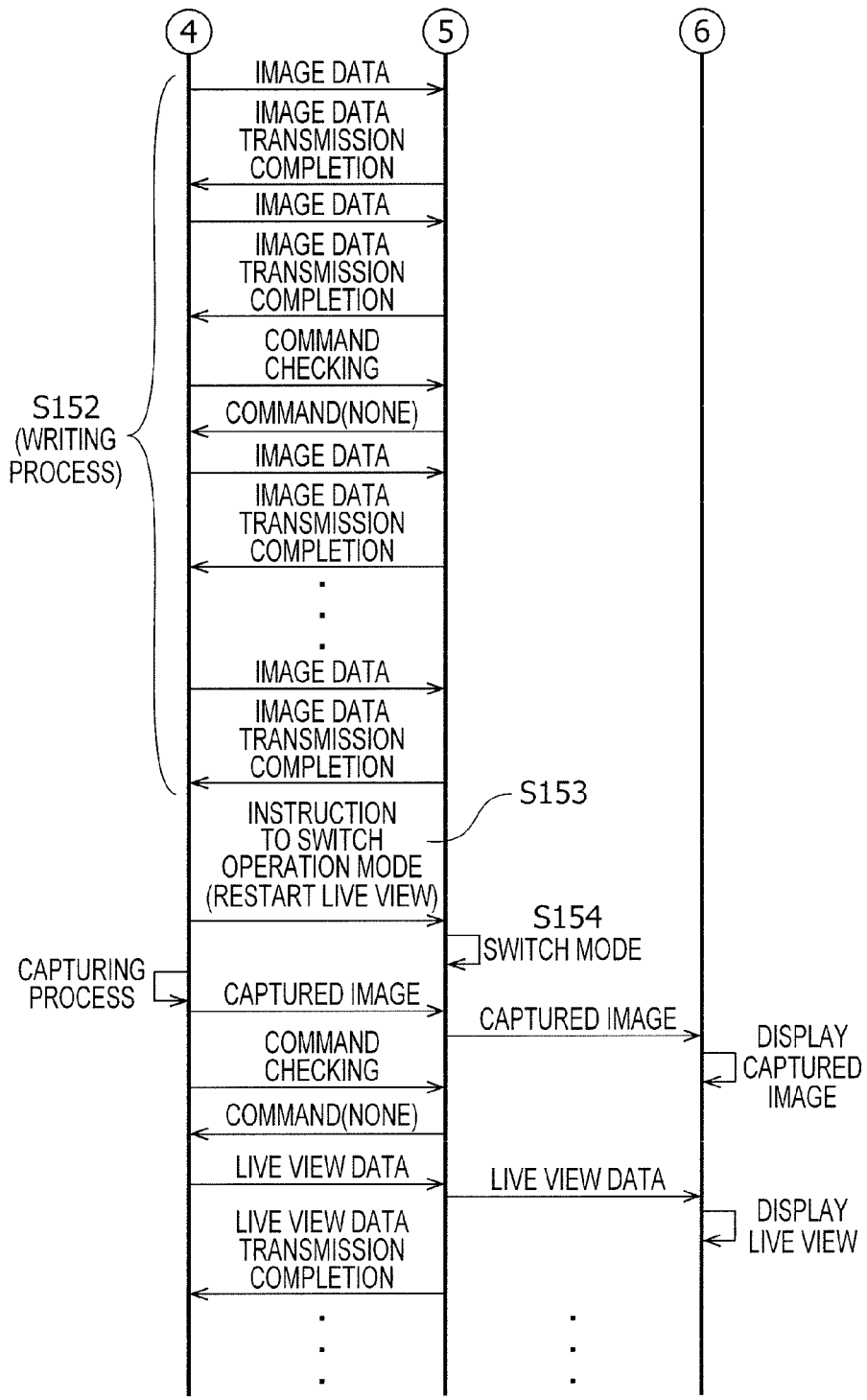

FIGS. 10A and 10B illustrate an example of a sequence diagram in the case where the AF process, the shutter process and the capturing process are executed in accordance with the remote control when the live view process is executed in the wireless communication system 1 according to the embodiment.

When the command such as the AF request command or the shutter request command, is transmitted from the terminal device 20 while the live view process is executed, transmission/reception of the command checking or the command response or the process according to the request command is executed concurrently with the live view process in the wireless communication system 1.

However, before the image data generated by the shutter process is written into the storage medium 30 by the imaging apparatus 10, an instruction to switch the operation mode of the storage medium 30 is transmitted from the imaging apparatus 10 to the storage medium 30 (S150). According to the instruction, the operation mode of the storage medium 30 is switched from the live view mode to the memory access mode (S151).

In the live view mode, the live view data which is transmitted from the SD host controller 120 is transmitted to the wireless communication module 306 via the SD card controller 302, the CPU 300 and the web server 308 in the storage medium 30.

In the memory access mode, the image data transmitted from the SD host controller 120 is transmitted to the memory unit 304 via the SD card controller 302 and the CPU 300, and is written into the memory unit 304. Alternatively, the image data stored in the memory unit 304 is transmitted to the SD host controller 120 via the CPU 300 and the SD card controller 302.

Before the imaging apparatus 10 writes the image data generated by the shutter process in the storage medium 30, the operation in the live view mode is executed on the storage medium 30 and the process in the memory access mode is not executed. When the instruction for switching the operation mode is transmitted from the imaging apparatus 10 to the storage medium 30 (S150), the operation mode of the storage medium 30 is switched from the live view mode to the memory access mode (S151). Then, the writing process (S152) of the image data to the memory unit 304 is executed in the state where the storage medium 30 operates in the memory access mode. After the writing process of the image data to the storage medium 30 is finished and the instruction for switching the operation mode is transmitted from the imaging apparatus 10 to the storage medium 30 (S153), the operation mode of the storage medium 30 is switched from the memory access mode to the live view mode (S154).

During a time period between stop and restart of the process in the live view mode of the storage medium 30 in accordance with the instruction to switch the operation mode transmitted from the imaging apparatus 10, new live view data is not transmitted to the terminal device 20. Therefore, in this case, a live view based on the lastly received live view data is displayed as a still image on the touch panel 208 of the terminal device 20. Alternatively, information other than the live view may be displayed on the touch panel 208 of the terminal device 20 until the live view mode is restarted.

While the process in the live view mode is stopped, the command checking process from the imaging apparatus 10 to the storage medium 30 may be executed in a predetermined cycle.

In the sequence diagram shown in FIGS. 10A and 10B, the instruction to permit execution of the process in the live view mode is transmitted from the imaging apparatus 10 to the storage medium 30 after completion of the writing process of the image data to the storage medium 30 by the imaging apparatus 10; however, the embodiment is not limited to such a configuration. The instruction to permit execution of the process in the live view mode may be transmitted from the imaging apparatus 10 to the storage medium 30 after a predetermined time has elapsed from the start of the shutter process by the imaging apparatus 10. In this case, the predetermined time may be defined appropriately depending on the size of the image data generated by the shutter process.

In the sequence diagram shown in FIGS. 10A and 10B, the live view process may be stopped while the captured image generated by the imaging apparatus 10 is transmitted to the terminal device 20 via the storage medium 30. As a result, the load on the imaging apparatus 10 and the storage medium 30 can be reduced. Furthermore, since the live view process is stopped, the transmission process of the captured image from the imaging apparatus 10 to the terminal device 20 can be speed up.

Thus, in the wireless communication system 1 according to the embodiment, the instruction to switch the operation mode is transmitted from the imaging apparatus 10 to the storage medium 30 depending on the status of the wireless communication system 1. As a result, the live view process and the writing process of the image data to the storage medium 30 are executed selectively. Consequently, the load of the signal processing on the storage medium 30 can be reduced.

In the live view process, the video signal is transmitted from the imaging apparatus 10 to the storage medium 30 in a predetermined cycle, and is subsequently transferred from the storage medium 30 to the terminal device 20. The live view data has a data size larger than, for example, the request command exchanged in the wireless communication system 1, and in order to maintain a real-time property of the live view data, the transmission cycle of the live view data is short (e.g., a cycle of 66 milliseconds). Accordingly, for the storage medium 30, the load of the live view process is large. Furthermore, regarding the writing process for writing the image data generated by the imaging apparatus 10 to the memory unit 304, the size of the image data is also large. Therefore, for the storage medium 30, the load of the writing process is large.

Therefore, in order to execute the live view process concurrently with the writing process for the image data, the storage medium 30 needs to have a large amount of resource for executing a high load process. However, due to size restriction by the standard for the storage medium 30 or the specifications of the imaging apparatus 10, it is impossible to configure the storage medium 30 to have a large amount of resource.

Furthermore, when the storage medium 30 is configured to have a large amount of resource, a problem arises that the storage medium 30 produces heat or the manufacturing cost of the storage medium 30 increases.

By contrast, according to the wireless communication system 1 of the embodiment, the storage medium 30 is controlled not to concurrently execute a plurality of high load processes. Therefore, it is possible to configure the storage medium 30 to have the function of processing the live view process without configuring the storage medium 30 to have a large amount of resource.

Command Process During Operation of Imaging Apparatus 10

Figure 11:
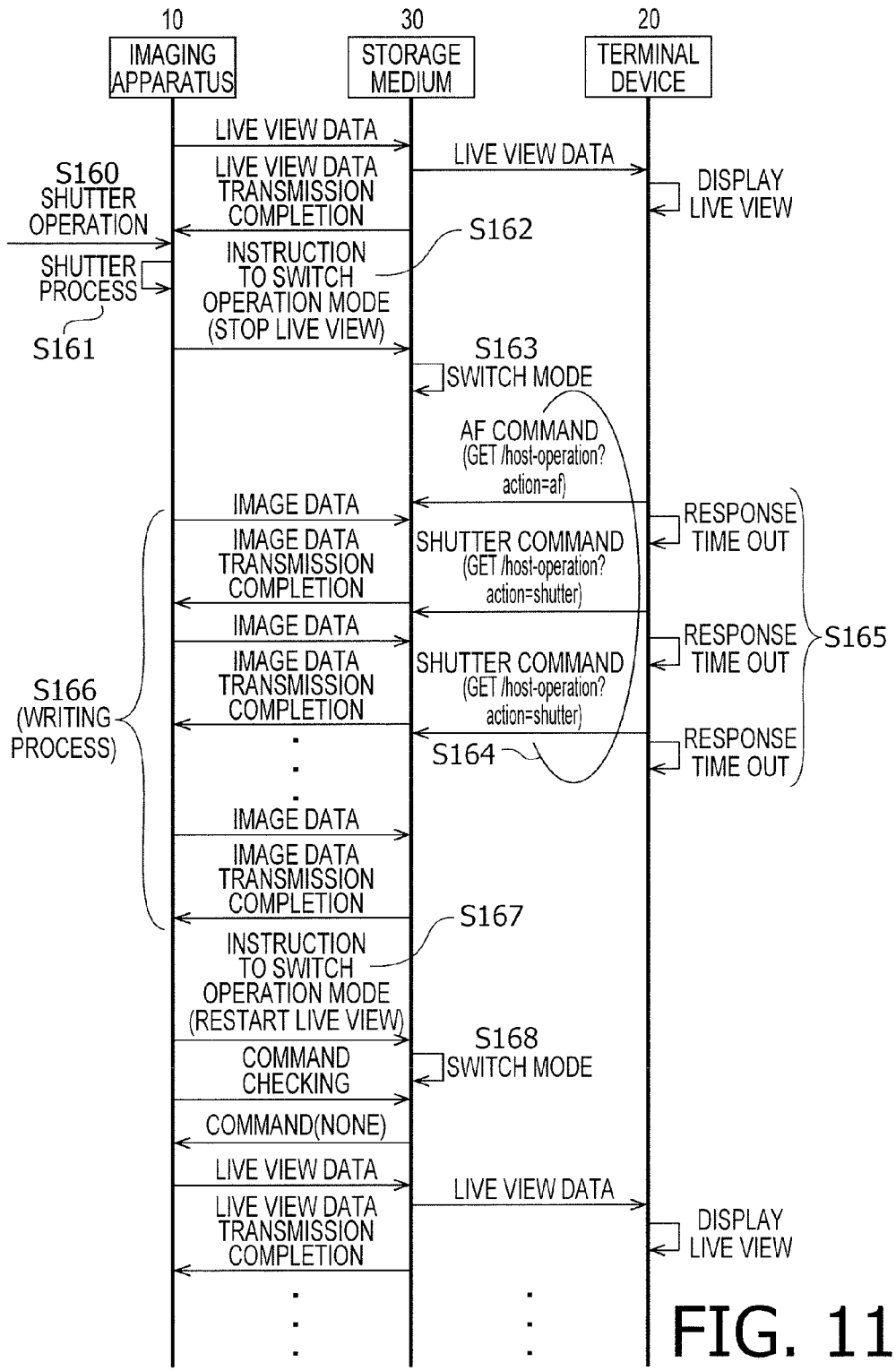
FIG. 11 is a sequence diagram during an operation to the imaging apparatus in the wireless communication system according to the embodiment of the invention.

FIG. 11 is an example of a sequence diagram in the case where a command is transmitted from the terminal device 20 while the operation unit 102 of the imaging apparatus 10 is operated.

The imaging apparatus 10 can be operated through use of the operation unit 102 of the imaging apparatus 10, and can also be operated by a command transmitted from the terminal device 20. When the operation unit 102 of the imaging apparatus 10 is not operated and a command is transmitted from the terminal device 20, the imaging apparatus 10 can be remotely controlled by the terminal device 20 as shown in FIGS. 8A and 8B, and 10A and 10B. On the other hand, when the operation unit 102 of the imaging apparatus 10 is operated, the storage medium 30 is configured not to accept a command transmitted from the terminal device 20 depending on the type of the operation to the operation unit 102.

The sequence diagram in FIG. 11 shows the case where a shutter operation is conducted to the imaging apparatus 10 when the live view process is executed. When a shutter operation is conducted to the operation unit 102 of the imaging apparatus 10 (S160), the shutter process is executed on the imaging apparatus 10 (S161). Then, an instruction to switch the operation mode is transmitted from the imaging apparatus 10 to the storage medium 30 (S162).

The instruction to switch the operation mode includes two instruction items. The first instruction item is a stop instruction to stop the live view process explained with reference to the sequence diagram shown in FIGS. 10A and 10B. The second instruction item is a stop instruction to stop a process for the command process transmitted from the terminal device 20. When the storage medium 30 receives the instruction to switch the operation mode, the operation mode is switched from the live view mode to the memory access mode, and of commands transmitted from the terminal device 20, a command process concerning the remote control of the imaging apparatus 10 is stopped (S163).

There are some methods for stopping a process for the command concerning the remote control of the imaging apparatus 10. In the example shown in FIG. 11, the storage medium 30 is configured such that, when the storage medium 30 receives the command concerning the remote control (S164), the storage medium 30 discards the command or denies receipt of the command. Therefore, the command transmitted from the terminal device 20 is not held on the storage medium 30, and the command concerning the remote control is not transmitted from the storage medium 30 to the terminal device 20 regardless of whether the command checking is executed from the imaging apparatus 10 to the storage medium 30. When no command response to the transmitted command is received even if a predetermined time or more has elapsed, the terminal device 20 determines that timeout has occurred for the transmitted command, and displays information indicating that the timeout has occurred for the command on the touch panel 208 according to the need (S165).

When the writing process (S166) for the image data generated through the shutter process is finished, the instruction to switch the operation mode is transmitted from the imaging apparatus 10 to the storage medium 30 (S167). With this instruction, the storage medium 30 switches from the memory access mode to the live view mode, and restarts the process for the command concerning the remote control in the storage medium 30 (S168).

As described above, according to the embodiment, when both of the operation to the operation unit 102 of the imaging apparatus 10 and the command transmitted from the terminal device 20 occurs at the same time, the operation to the operation unit 102 of the imaging apparatus 10 is handled preferentially. Therefore, when instructions for different processes are inputted from the operation unit 102 and the terminal device 20 to the imaging apparatus 10, the imaging apparatus 10 is prevented from becoming unable to operate properly.

In FIG. 11, the storage medium 30 operates to stop the process for the command concerning the remote control by discarding the command or by denying receipt of the command; however, the embodiment is not limited to such a configuration. When the shutter operation is conducted to the imaging apparatus 10, the imaging apparatus 10 may stop the command checking process in place of the configuration in which the imaging apparatus 10 transmits the stop instruction for the command process to the storage medium 30.

In this case, regardless of whether the storage medium 30 holds the command received from the terminal device 20, the remote control based on the command is not executed on the imaging apparatus 10. When the writing process for the image data generated by the shutter process is finished, the imaging apparatus 10 restarts the command checking process. When the storage medium 30 holds the command received while the command checking process is stopped, the command held on the storage medium 30 is transmitted to the imaging apparatus 10 after restart of the command checking process. The imaging apparatus 10 executes the process based on the held command, and transmits the command response. On the other hand, when the storage medium 30 does not hold the command received while the command checking process is stopped and has discarded or denied receipt of the command, the terminal device 20 determines that timeout has occurred for the transmitted command.

In the sequence diagram shown in FIG. 11, when the storage medium 30 receives the stop instruction for the process of the command, the storage medium 30 stops the process of the command concerning the remote control; however, the embodiment is not limited to such a configuration. The storage medium 30 may be configured to stop a process of a command other than the command concerning the remote control. For example, when the storage medium 30 receives a stop instruction for the process of the command, the storage medium 30 may stop a process for an obtaining command for obtaining a list or a thumbnail shown in FIG. 6.

In order to execute the process based on the obtaining command for obtaining a list or a thumbnail, the storage medium 30 needs to access the memory unit 304 and to read out required data. However, when the storage medium 30 reads out the required data from the memory unit 304 while the writing process for the image data to the memory unit 304 is executed by the imaging apparatus 10, the reading process and the writing process for data are executed concurrently. As a result, the load of the data processing on the storage medium 30 increases.

By contrast, by configuring the storage medium 30 such that, when the storage medium 30 receives the stop instruction for the process of the command, the storage medium 30 also stops the process of the obtaining command for obtaining a list or a thumbnail, it becomes possible to prevent the reading process and the writing process of data from being executed concurrently with respect to the memory unit 304 and thereby it becomes possible to decrease the load on the storage medium 30.

In the sequence diagram shown in FIG. 11, when the shutter operation is conducted to the operation unit 102 of the imaging apparatus 10, the instruction to switch the operation mode is transmitted from the imaging apparatus 10 to the storage medium 30; however, the embodiment is not limited to such a configuration. When an operation for requesting a reproducing process for the image data is conducted to the operation unit 102 of the imaging apparatus 10, the instruction to switch the operation mode may be transmitted from the imaging apparatus 10 to the storage medium 30. The reproducing process means a process where the imaging apparatus 10 reads out the image data stored in the storage medium 30 and displays the image data on the LCD 124.

Change of Cycle of Command Checking

The cycle in which the command checking is transmitted from the imaging apparatus 10 to the storage medium 30 may not necessarily be set to a constant value, but may change depending on the status of the wireless communication system 1.

For example, in the sequence diagram shown in FIGS. 8A and 8B or 10A and 10B, the cycle in which the command checking is executed by the imaging apparatus 10 may be set to a short value (e.g., 33 milliseconds) during a period from a time when the imaging apparatus 10 executes the AF process to a time when the imaging apparatus 10 receives the shutter command.

Typically, after the imaging apparatus 10 is instructed to execute the AF process, there is a high possibility that the shutter process is executed. Therefore, by setting the cycle of the command checking after the AF process to a short value, it becomes possible to shorten the time difference between the time when the shutter request operation is conducted by the user to the terminal device 20 and the time when the imaging apparatus 10 executes the shutter process. As a result, the imaging apparatus 10 becomes able to execute the shutter process at desired timing for the user. Consequently, it becomes possible to prevent a desired shutter chance from being missed by the user.

In the sequence diagram shown in FIGS. 10A and 10B, the live view process may be stopped while the imaging apparatus 10 transmits the captured image to the terminal device 20 via the storage medium 30, and the cycle in which the command checking with respect to the storage medium 30 is executed by the imaging apparatus 10 may be set to a longer value (e.g., 132 milliseconds). With this configuration, the load on the imaging apparatus 10 and the storage medium 30 can be reduced, and it becomes possible to speed up the transmission process of the captured image.

After the imaging apparatus 10 finishes the shutter process, typically the user waits until the terminal device 20 displays the captured image to check the generated image data, and does not conduct an input operation for newly requesting a process to the imaging apparatus 10. Therefore, even when the cycle in which the command checking is executed is set to a longer value while the captured image is being transmitted to the terminal device 20, an inconvenience (e.g., occurrence of the time difference between the time of execution of the input operation and the time when the imaging apparatus 10 actually executes the process) does not arise.

When the remote control for the imaging apparatus 10 is executed by the terminal device 20 without executing the live view process as shown in the sequence diagram of FIGS. 8A and 8B, the cycle in which the command checking with respect to the storage medium 30 is executed by the imaging apparatus 10 may be set to a shorter value (e.g., 33 milliseconds). When the live view process is executed, it is desirable to set the cycle of the command checking to a longer value in order to reduce the load on the storage medium 30. By contrast, in the case where the live view process is not executed, the load on the storage medium 30 does not increase even if the cycle of the command checking is set to a shorter value. Therefore, it becomes possible to prevent a desired shutter chance from being missed by the user.

When the command checking with respect to the storage medium 30 is not normally executed by the imaging apparatus 10 and thereby an error occurs due to an interruption to the imaging apparatus 10 or some reasons, the cycle for the command checking may be set to a shorter value (e.g., 33 milliseconds) until the command checking is executed normally. As a result, it becomes possible to cancel the error caused during the command checking immediately.

Touch Shutter Process

Figure 12A:
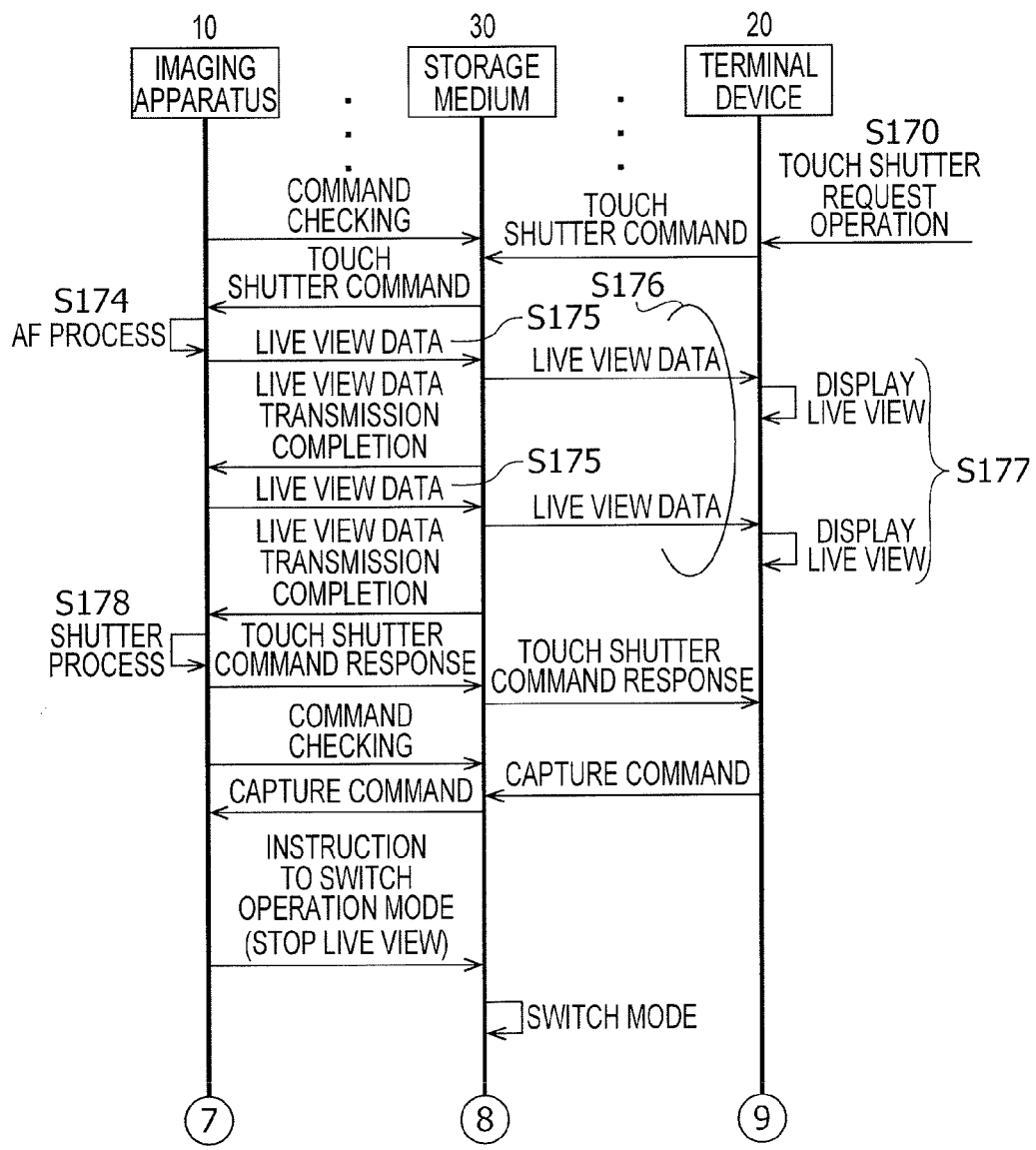
FIGS. 12A and 12B illustrate a sequence diagram in a case where a touch shutter process is started in the wireless communication system according to the embodiment of the invention.
Figure 12B:
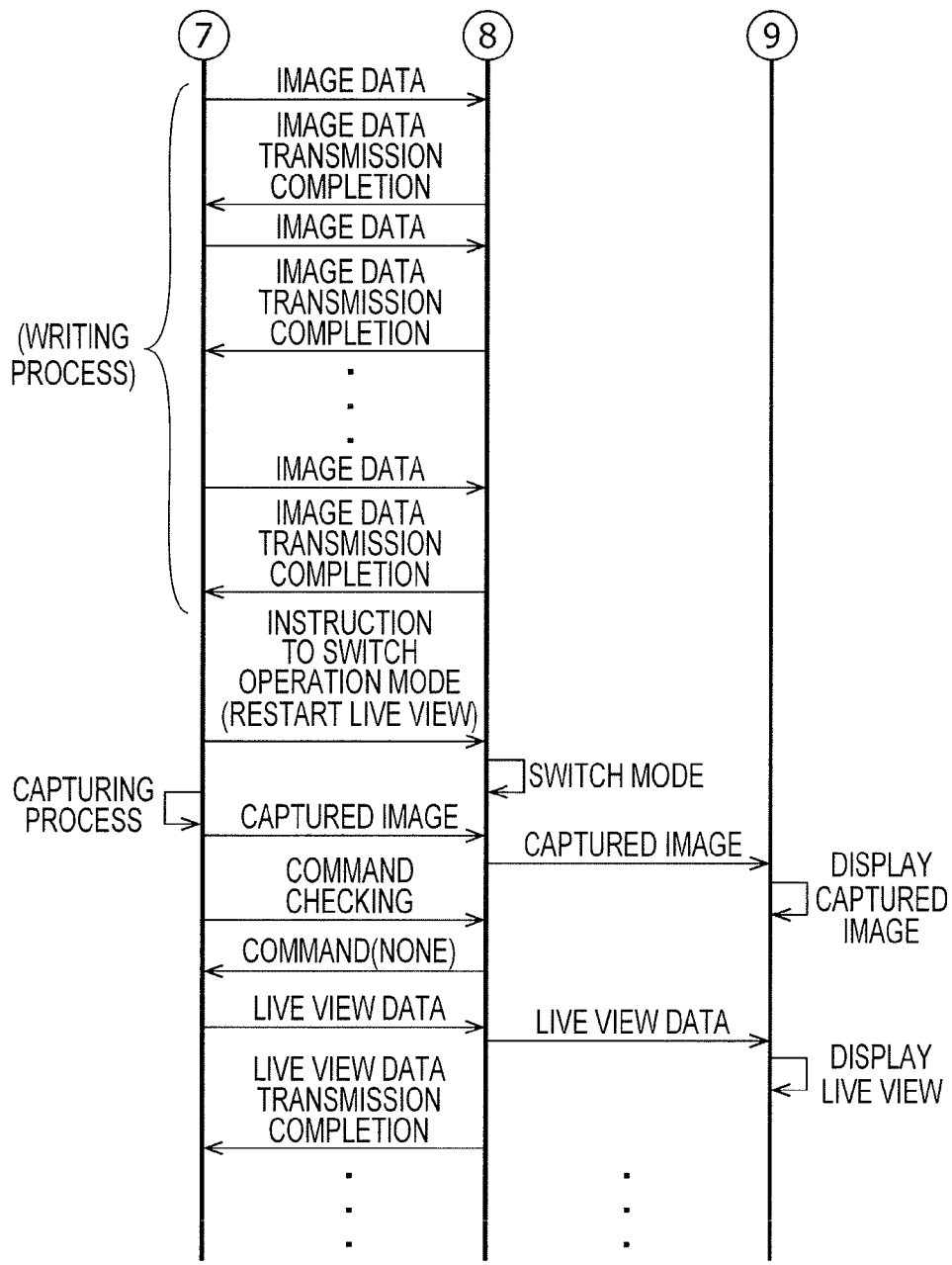

FIGS. 12A and 12B illustrate a sequence diagram illustrating the case where an operation for requesting a touch shutter process is inputted to the terminal device 20 when the wireless communication system 1 according to the embodiment executes the live view process.

The touch shutter process means the function in which the imaging apparatus 10 sequentially executes the AF process and the shutter process in response to one input operation to the touch panel 208 by the user. In the sequence diagram shown in FIGS. 8A and 8B or 10A and 10B, the user needs to conduct separately an operation for requesting the AF process and an operation for requesting the shutter process, and therefore there is a possibility that the user misses a shutter chance. By contrast, in the touch shutter process, the imaging apparatus 10 successively executes the AF process and the shutter process in response to one input operation. Therefore, it becomes possible to prevent a desired shutter chance from being missed by the user.

When an operation for requesting the touch shutter process is conducted to the touch panel 208 during the live view process (S170), the browser generates a command for requesting execution of the touch shutter process and transmits the command to the web server 308 (S171). The web server 308, upon receipt of the command, recognizes that an URI designated by the request command is CGI for realizing the remote control for the imaging apparatus 10. When the command checking is executed by the imaging apparatus 10 subsequently (S172), the received request command is transmitted to the imaging apparatus 10 as it is via the CPU 300 and the SD card controller 302 (S173). The imaging apparatus 10 executes the AF process in accordance with the received request command (S174).

When the AF process of the imaging apparatus 10 is finished, the imaging apparatus 10 transmits the video signal corresponding to at least one frame generated by the image processing engine 116 to the storage medium 30 as live view data (S175). The storage medium 30 transmits the received live view data to the terminal device 20 (S176). Then, the terminal device 20 displays the live view on the touch panel 208 based on the received live data (S177).

After transmitting the live view data, the imaging apparatus 10 executes the shutter process (S178). When the shutter process is executed normally, a command response indicating that the touch shutter processes is executed is transmitted from the imaging apparatus 10 to the terminal device 20 (S179 and S180). The subsequent processes are the same as those of the processes shown in the sequence diagram of FIGS. 10A and 10B executed after transmission of the command response indicating execution of the shutter process from the imaging apparatus 10 to the terminal device 20.

As described above, in the sequence diagram shown in FIGS. 12A and 12B, during the touch shutter process, the video signal of at least one frame is transmitted as the live view to the terminal device 20 before execution of the shutter process and after execution of the AF process. Therefore, on the touch panel 208 of the terminal device 20, the live view image is displayed during a period from input of an operation for requesting the touch shutter process to the display of the captured image. As a result, the user is able to check an image to be photographed by watching the live view, before the captured image is displayed.

Assigning Serial Number to Command

Figure 13A:
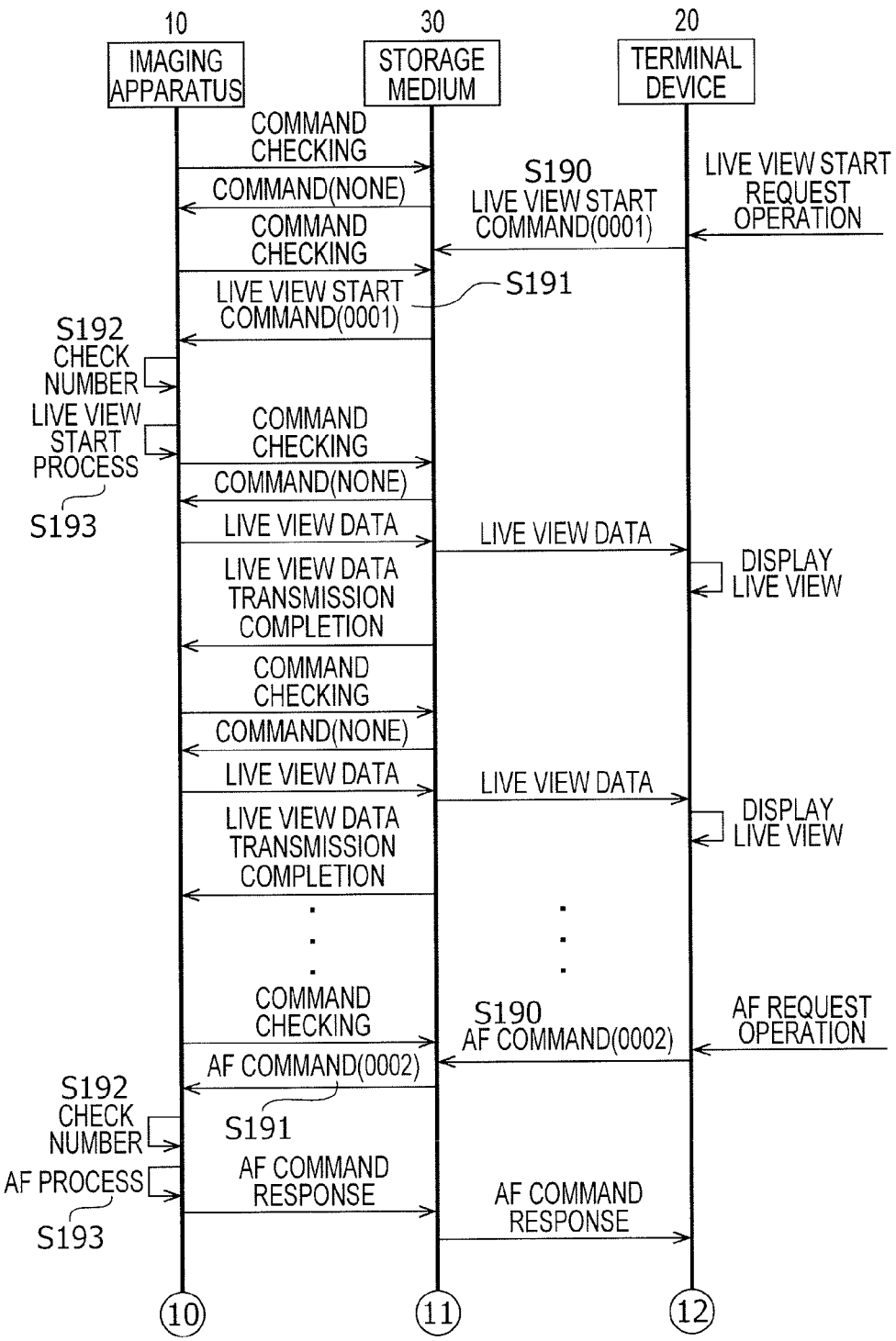
FIGS. 13A and 13B illustrate a sequence diagram in a case where a serial number is assigned to a command in the wireless communication system according to the embodiment of the invention.
Figure 13B:
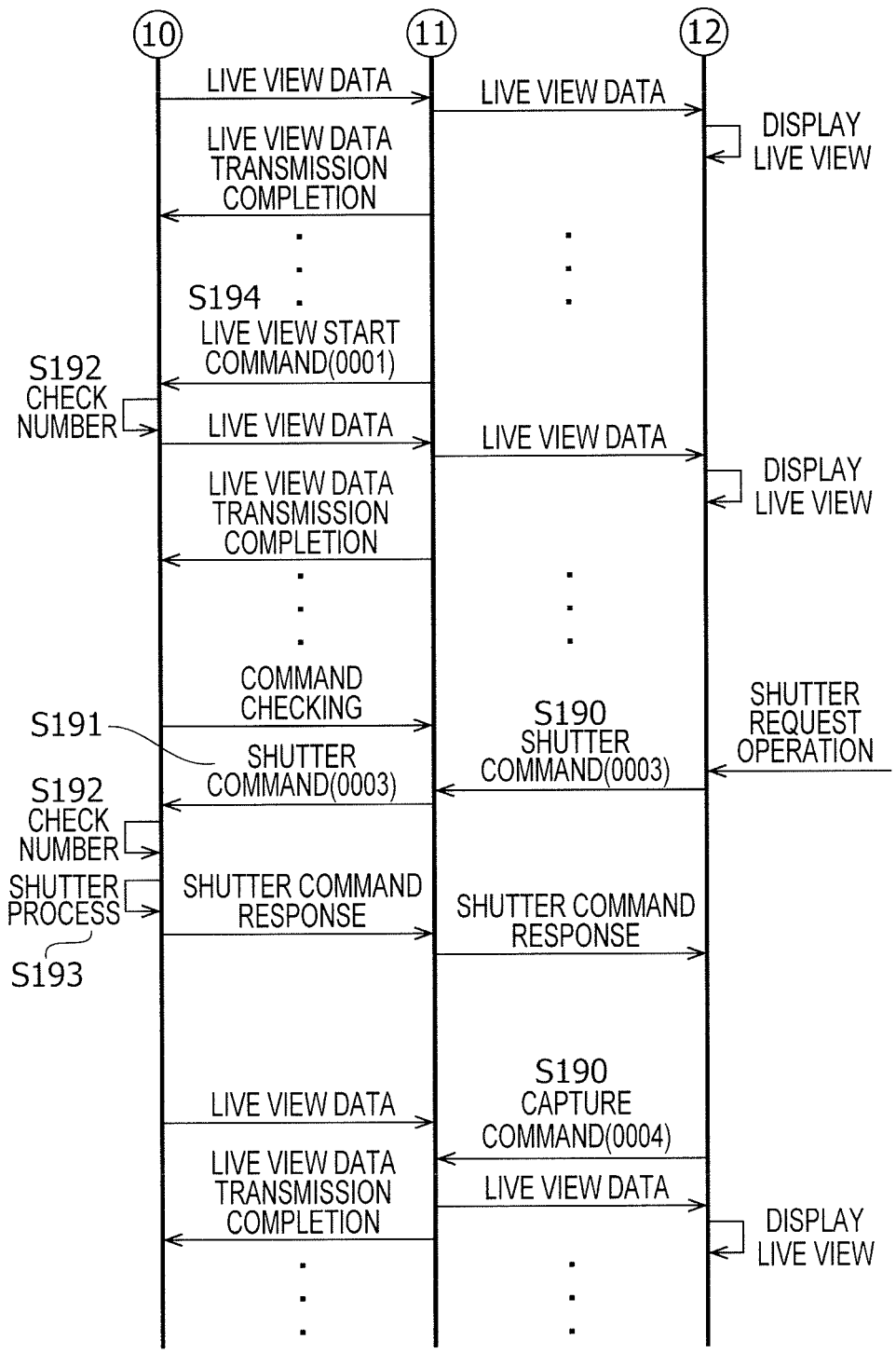

In the wireless communication system 1 according to the embodiment, when the browser of the terminal device 20 generates a command, a serial number may be assigned to each command. FIGS. 13A and 13B illustrate an example of a sequence diagram showing the case where a serial number is assigned to each command when the browser of the terminal device 20 generates a command.

When a command to which a serial number has been assigned is transmitted from the terminal device 20 to the storage medium 30 (S190), the storage medium 30 recognizes that a URI designated by the received command is CGI for realizing the remote control of the imaging apparatus 10. When the command checking is executed by the imaging apparatus 10, the received request command is transmitted to the imaging apparatus 10 as it is via the CPU 300 and the SD card controller 302 (S191). The imaging apparatus 10, upon receipt of the command, checks the serial number of the command, and determines whether to execute the process corresponding to the command (S192). When the imaging apparatus 10 determines that the received command is to be executed based on the serial number of the received command, the imaging apparatus 10 executes the process corresponding to the command (S193). On the other hand, when the imaging apparatus 10 determines that the received command is not to be executed, the imaging apparatus 10 does not execute the process corresponding to the command.

In the sequence diagram shown in FIGS. 13A and 13B, the serial number 0001 is assigned to the live view start command, the serial number 0002 is assigned to the AF command and the serial number 0003 is assigned to the shutter command. When the sequence of the wireless communication system 1 is being executed normally, the imaging apparatus 10 receives the command in the order of the serial number, and executes the process corresponding to the command. However, there is a case where an error occurs in the wireless communication system 1, and the imaging apparatus 10 receives again the command which has been executed once or the imaging apparatus 10 receives the command having an older serial number (S194). When an error of this type occurs, the imaging apparatus 10 is able to determine whether the command is received according to normal sequence or the command is received by an error by checking the serial number of each command. As a result, the wireless communication system 1 is able to normally execute the sequence even when the imaging apparatus 10 receives an incorrect command.

Consecutive Photographing Process

Figure 14A:
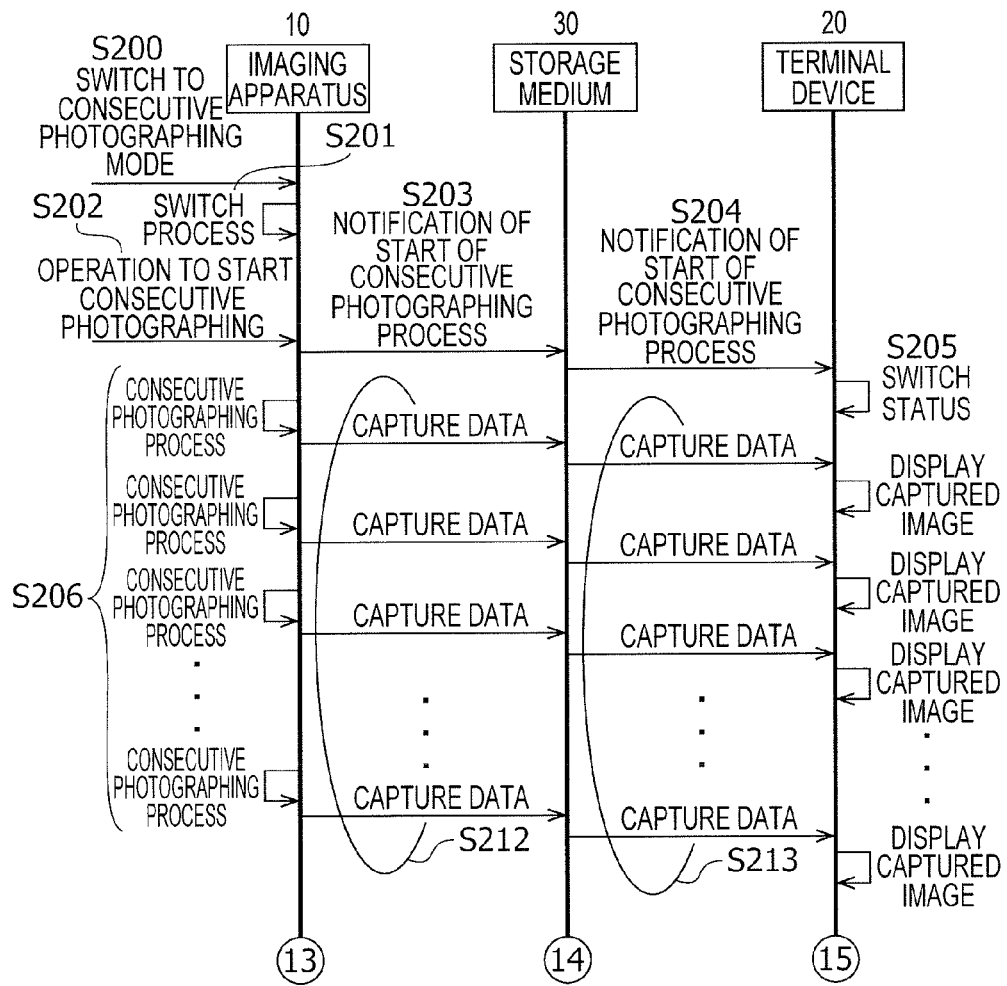
FIGS. 14A and 14B illustrate a sequence diagram in a case where consecutive photographing is started in the wireless communication system according to the embodiment of the invention.
Figure 14B:
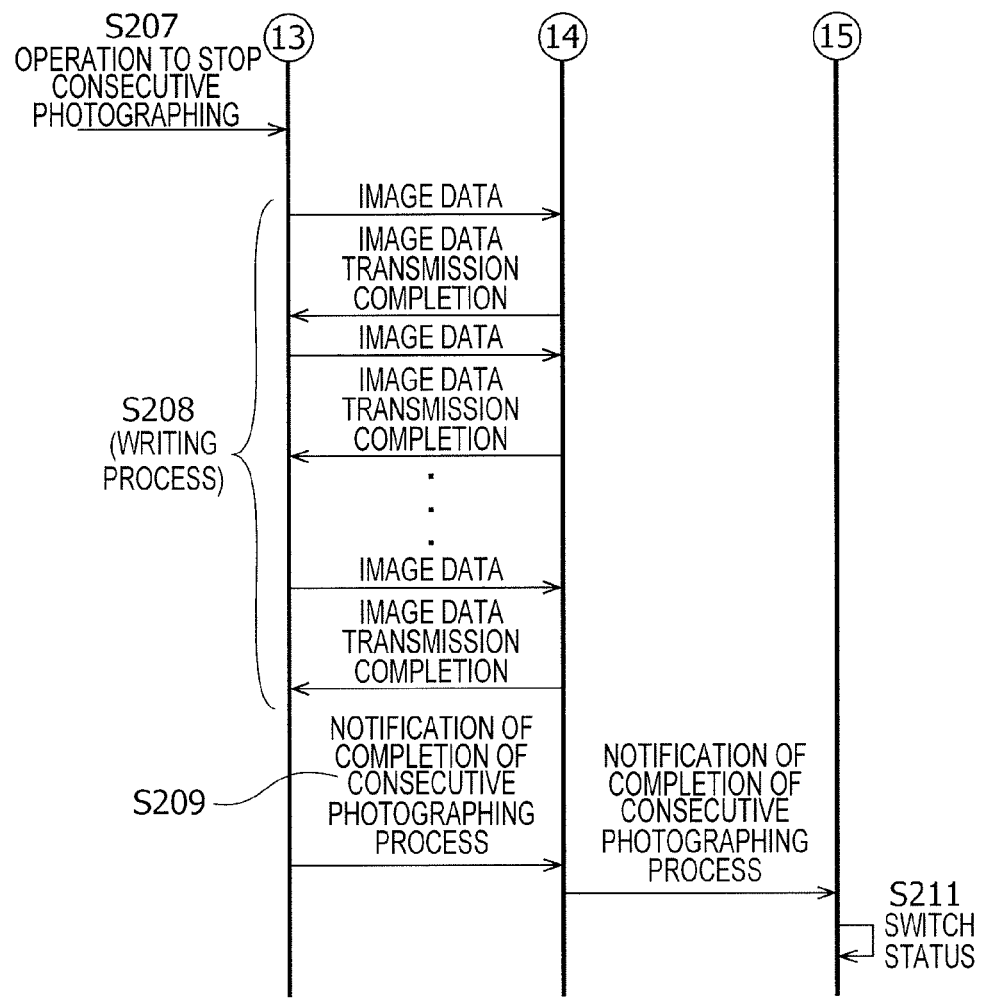

FIGS. 14A and 14B illustrate an example of a sequence diagram showing the case where an operation for executing consecutive photographing is inputted to the operation unit 102 of the imaging apparatus 10 by the user.

Whether to instruct the imaging apparatus 10 to execute the shutter process one by one (the single photographing mode) or to execute the consecutive photographing (consecutive photographing mode) may be switched by operating, for example, a mode change switch (S200) which is one of switches of the operation unit 102 of the imaging apparatus 10 (S201). When an operation for requesting the consecutive photographing is input to the imaging apparatus 10 (S202), a notification indicating start of the consecutive photographing process is transmitted from the imaging apparatus 10 to the terminal device 20 via the storage medium 30 (S203 and S204). The terminal device 20, upon receipt of the notification, changes its status (S205), and access to the memory unit 304 of the storage medium 30 from the terminal device 20 is inhibited. By inhibiting access to the memory unit 304 from the terminal device 20, the terminal device 20 becomes unable to transmit the command for obtaining a thumbnail of the image data to the storage medium 30 as shown in the sequence diagram of FIG. 6. As a result, the writing process where the image data generated by the consecutive photographing is written into the memory unit 304 and access to the memory unit 304 from the terminal device 20 are prevented from occurring concurrently, and thereby the load on the storage medium 30 is prevented from becoming large.

Upon transmission of a notification indicating start of the consecutive photographing process, the imaging apparatus 10 executes the consecutive photographing process (S206). In the consecutive photographing process, the image data is generated based on the image signal generated by the image sensor 112, and is stored in the buffer memory 118 in the imaging apparatus 10. The consecutive photographing process is repeatedly executed until a request for stop of the consecutive photographing process is input to the imaging apparatus 10 (S207), until a predetermined number of image data are generated, or until the buffer memory 118 in the imaging apparatus 10 becomes full. When the consecutive photographing process is finished, a plurality of image data stored in the buffer memory 118 are transmitted to the storage medium 30, and are stored in the memory unit 304 (S208). When all the image data stored in the buffer memory 118 is stored in the memory unit 304, a notification indicating completion of the consecutive photographing process is transmitted from the imaging apparatus 10 to the terminal device 20 (S209 and S210). The terminal device 20, upon receipt of the notification, changes its status (S211), and inhibition of access to the memory unit 304 of the storage medium 30 from the terminal device 20 is released.

During execution of the consecutive photographing process by the imaging apparatus 10, the imaging apparatus 10 may generate a captured image based on the generated image data. The generated captured image is sequentially transmitted to the terminal device 20 via the storage medium 30 (S212 and S213). The terminal device 20 sequentially displays the received captured images on the touch panel 208. As a result, the user becomes able to check the plurality of image data generated by the consecutive photographing process on the terminal device 20.

In the case where the captured image is transmitted to the terminal device 20 during execution of the consecutive photographing process by the imaging apparatus 10, only the transferring process of the captured image is executed on the storage medium 30, and the writing process or the reading process with respect to the memory unit 304 is not executed. Therefore, even when the consecutive photographing process and the transferring process of the captured image are executed concurrently, a high degree of load does not occur on the storage medium 30.

The consecutive photographing process can be executed during execution of the live view process. In this case, when an operation for requesting the consecutive photographing process is input to the operation unit 102 of the imaging apparatus 10 while the wireless communication system 1 executes the live view process, a notification indicating start of the consecutive photographing process is transmitted from the imaging apparatus 10, and the live view process by the wireless communication system 1 stops. Furthermore, in the wireless communication system 1, a notification indicating end of the consecutive photographing process is transmitted from the imaging apparatus 10, and the live view process is restarted. Thus, by selectively executing the consecutive photographing process and the live view process, the storage medium 30 is prevented from concurrently executing the writing process where the image data generated by the consecutive photographing process is written into the storage medium 30 and the live view process, and thereby the load on the storage medium 30 can be reduced.

The foregoing is the explanation about the embodiment of the invention. The invention is not limited to the above described embodiment, but can be varied in various ways within the scope of the invention. For example, the invention includes a combination of embodiments explicitly described in this specification and embodiments easily realized from the above described embodiment.

This application claims priority of Japanese Patent Application No. P2013-226066, filed on Oct. 30, 2013. The entire subject matter of the application is incorporated herein by reference.

What is claimed is:

1. A wireless communication system, comprising:
an imaging apparatus;
a storage medium attached to the imaging apparatus; and
a terminal device configured to execute wireless communication with the storage medium,
wherein the imaging apparatus comprises:
a controller configured to control operation of the imaging apparatus and to execute transmission/reception of data between the imaging apparatus and the storage medium;
wherein the storage medium comprises:
a first wireless communication unit configured to execute wireless communication with the terminal device; and
a control unit configured to execute transmission/reception of data between the storage medium and the imaging apparatus and transmission/reception of data between the storage medium and the terminal device,
wherein the terminal device comprises:
a command generating unit configured to generate a command for controlling the operation of the imaging apparatus; and
a second wireless communication unit configured to execute wireless communication with the storage medium,
wherein:
the controller executes a checking process to determine whether or not the storage medium has received the command through wireless communication in a predetermined cycle; and
when the controller determines that the storage medium has received the command through the checking process, the controller controls the operation of the imaging apparatus in accordance with the command and transmits an instruction to change operation of the control unit to the storage medium in accordance with the operation of the imaging apparatus.

2. The wireless communication system according to claim 1,
wherein the imaging apparatus further comprises:
an image pickup device configured to generate an image signal of a subject;
an image data generating unit configured to generate image data based on the image signal generated by the image pickup device;
an imaging optical system that forms a subject image on the image pickup device; and
an automatic focusing device configured to execute an autofocus process to detect a focal position of the subject image by moving at least a part of the imaging optical system,
wherein:
the automatic focusing device is configured to execute the autofocus process when the command checked by the checking process is an autofocus command;
the image data generating unit is configured to generate the image data based on the image signal when the command checked by the checking process is a photographing command; and
the controller executes a writing process of the image data into the storage medium.

3. The wireless communication system according to claim 2,
wherein:
the imaging apparatus further comprises a video signal generating unit configured to generate a video signal based on the image signal;
the video signal generating unit is configured to generate the video signal when the command checked by the checking process is a live view command;
the controller executes a transmission process to transmit the generated video signal to the storage medium by frame; and
the storage medium transmits the video signal to the terminal device by wireless communication.

4. The wireless communication system according to claim 3,
wherein:
while the controller executes the writing process of the image data into the storage medium, the controller stops the transmission process to transmit the generated video signal to the storage medium by frame; and the controller restarts the transmission process when the writing process of the image data is finished.

5. The wireless communication system according to claim 3, wherein:

the imaging apparatus further comprises a captured image generating unit configured to generate a captured image whose data size is smaller than that of the image data based on the image data generated by the image data generating unit;

when the command checked by the checking process is a captured image generating command, the captured image generating unit generates the captured image based on the image data generated by the image data generating unit; and the controller transmits the captured image to the storage medium.

6. The wireless communication system according to claim 5, wherein:

while the controller transmits the captured image to the storage medium, the controller lengthens a cycle in which the checking process is executed relative to the predetermined cycle and stops the transmission process to transmit the video signal to the storage medium; and when transmission of the captured image to the storage medium is finished, the controller changes the cycle in which the checking process is executed to the predetermined cycle and restarts the transmission process of the video signal.

7. The wireless communication system according to claim 3, wherein the controller operates to:

make the cycle in which the checking process is executed shorter than the predetermined cycle while the transmission process of the video signal is stopped; and make the cycle in which the checking process is executed equal to the predetermined cycle while the transmission process of the video signal is executed.

8. The wireless communication system according to claim 3, wherein when the controller confirms that the storage medium has received a touch shutter command through the checking process, the automatic focusing device executes the autofocus process;

the controller executes a transmission process in which the video signal generated based on the image signal generated after execution of the autofocus process is transmitted to the storage medium by a predetermined number of frames;

the image data generating unit generates the image data based on the image signal generated after execution of the autofocus process after the transmission process of the video signal is finished; and the controller executes the writing process of the generated image data into the storage medium.

9. The wireless communication system according to claim 2, wherein, when the command checked by the checking process is the autofocus command, the controller subsequently shortens, for a subsequent predetermined time, a cycle in which the checking process is executed relative to the predetermined cycle.

10. The wireless communication system according to claim 2, wherein the imaging apparatus further comprises a display device, wherein the controller operates to:

transmit, to the storage medium, an instruction to inhibit executing wireless communication with the terminal device while the display device displays the image data stored in the storage medium in accordance with an input operation to the imaging apparatus by a user; and transmit, to the storage medium, an instruction to permit executing wireless communication with the terminal device while the display device does not display the image data stored in the storage medium.

11. The wireless communication system according to claim 2, wherein:

the storage medium further comprises a thumbnail generating unit configured to generate a thumbnail image having a size smaller than that of the image data based on the image data stored in the storage medium;

the terminal device further comprises an operation receiving unit configured to receive an input operation by a user; and the terminal device obtains the thumbnail image stored in the storage medium by wireless communication in response to the input operation.

12. The wireless communication system according to claim 11, wherein, when the imaging apparatus receives an input of an instruction to execute consecutive photographing by the user, the image data generating unit executes the consecutive photographing in which a plurality of image data is generated based on the image signal at a predetermined time interval and the plurality of image data are sequentially stored in the storage medium until a number of the plurality of image data reaches a predetermined number or until an input of an instruction to stop the consecutive photographing is received, and wherein:

the terminal device further comprises a detection unit configured to detect execution of the consecutive photographing on the imaging apparatus; and when the detection unit detects that the consecutive photographing is being executed, the terminal device inhibits obtaining of the thumbnail image from the storage medium.

13. The wireless communication system according to claim 12, wherein the imaging apparatus further comprises a generating unit configured to sequentially generate, based on the plurality of image data generated through the consecutive photographing, a plurality of captured images each having a data size smaller than each of the plurality of the image data, wherein the controller transmits sequentially the generated plurality of captured images to the terminal device while the imaging apparatus executes the consecutive photographing.

14. The wireless communication system according to claim 1, wherein the controller operates to:

stop the checking process when the imaging apparatus executes a process based on an input operation to the imaging apparatus by a user; and restart the checking process when the process based on the input operation to the imaging apparatus is finished.

15. The wireless communication system according to claim 1,
wherein the controller operates to:
transmit, to the storage medium, an instruction to inhibit executing wireless communication with the terminal device when the imaging apparatus executes a process based on an input operation to the imaging apparatus by a user; and
transmit, to the storage medium, an instruction to permit executing wireless communication with the terminal device when the process based on the input operation is finished.

16. The wireless communication system according to claim 1,
wherein the second wireless communication unit of the terminal device transmits, to the storage medium via wireless communication, the command generated by the command generating unit together with a sequence number representing order at which the command is generated,
wherein the controller operates to:
check the sequence number as well as the command in the checking process; and
ignore the command checked in the checking process when the sequence number is older than the sequence number of the command which has been already used for control of the imaging apparatus.

17. The wireless communication system according to claim 1,
wherein the controller operates to:
set the cycle in which the checking process is executed to a shorter cycle than the predetermine cycle when the controller is not able to confirm that the storage medium has received the command; and
set the cycle in which the checking process is executed to a cycle equal to the predetermined cycle when the controller confirms that the storage medium has received the command through the checking process being executed in the shorter cycle.

* * * * *